(12) United States Patent
Kim et al.

(10) Patent No.: US 10,720,060 B2
(45) Date of Patent: Jul. 21, 2020

(54) INFORMATION PROCESSING APPARATUS, INFORMATION PROCESSING SYSTEM, AND INFORMATION PROCESSING METHOD

(71) Applicant: TOYOTA JIDOSHA KABUSHIKI KAISHA, Toyota-shi, Aichi-ken (JP)

(72) Inventors: Yeonseo Kim, Miyoshi (JP); Shin Sakurada, Toyota (JP); Daisuke Tanabe, Nagoya (JP); Ayana Takeshita, Toyota (JP); Hiroyuki Tokita, Toyota (JP); Koichi Asamoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/435,824

(22) Filed: Jun. 10, 2019

(65) Prior Publication Data

US 2019/0392714 A1    Dec. 26, 2019

(30) Foreign Application Priority Data

Jun. 21, 2018   (JP) .................................. 2018-117928

(51) Int. Cl.
*G08G 1/00* (2006.01)
*H04M 1/725* (2006.01)
*G06Q 10/02* (2012.01)

(52) U.S. Cl.
CPC ............ *G08G 1/202* (2013.01); *G06Q 10/02* (2013.01); *H04M 1/72563* (2013.01)

(58) Field of Classification Search
CPC .... G08G 1/202; H04M 1/72563; G06Q 10/02
See application file for complete search history.

(56) References Cited

U.S. PATENT DOCUMENTS

| | | | |
|---|---|---|---|
| 10,299,216 B1 * | 5/2019 | Wengreen | B60L 58/12 |
| 2017/0169366 A1 * | 6/2017 | Klein | G06Q 10/025 |

FOREIGN PATENT DOCUMENTS

JP    2007-207077 A    8/2007

* cited by examiner

*Primary Examiner* — Christopher M Brandt
(74) *Attorney, Agent, or Firm* — Oliff PLC

(57) ABSTRACT

An information processing apparatus includes a controller configured to perform, in a case where a possibility of communication interruption due to an insufficient remaining amount of battery is detected for a first wireless communication terminal used by a first user for whom a ride reservation for a vehicle is established with a driver of the vehicle, a process regarding a meet-up schedule of the driver and the first user of the ride reservation. The process regarding a meet-up schedule may be cancellation of the ride reservation, change of a scheduled meet-up location, or the like.

10 Claims, 10 Drawing Sheets

FIG. 4

| DRIVER ID | VEHICLE RIDE SEEKER ID | VEHICLE NUMBER | SCHEDULED MEET-UP LOCATION | SCHEDULED MEET-UP TIME | DESIRED ALIGHTING LOCATION OF VEHICLE RIDE SEEKER | DESIRED ARRIVAL TIME OF VEHICLE RIDE SEEKER | RIDE-SHARING PASSENGER PRESENCE /ABSENCE |
|---|---|---|---|---|---|---|---|
| S001 | C001 | ... | f | 8:00 | g | 9:00 | ABSENCE |
| S002 | C002 | ... | h | 8:30 | e | 9:30 | PRESENCE |
| S002 | C003 | ... | i | 8:45 | j | 9:15 | PRESENCE |

INFORMATION PROCESSING APPARATUS, INFORMATION PROCESSING SYSTEM, AND INFORMATION PROCESSING METHOD

CROSS REFERENCE TO RELATED APPLICATION

This application claims the benefit of Japanese Patent Application No. 2018-117928, filed on Jun. 21, 2018, which is hereby incorporated by reference herein in its entirety.

BACKGROUND

Technical Field

The present disclosure relates to an information processing apparatus, an information processing system, and an information processing method.

Description of the Related Art

Patent document 1 discloses a vehicle dispatch information providing system in which a vehicle dispatch reservation is made on a user reservation terminal.

CITATION LIST

Patent Document

Patent document 1: Japanese Patent Laid-Open No. 2007-207077

The present disclosure has its object to provide an information processing apparatus, an information processing system, and an information processing method that are capable of avoiding a trouble that is expected to arise, regarding meeting up of a driver of a vehicle and a first user for whom a ride reservation for the vehicle is established, because of an insufficient remaining amount of battery in a wireless communication terminal that is used by the first user.

SUMMARY

One aspect of the present disclosure is an information processing apparatus comprising a controller configured to perform, when a possibility of communication interruption due to an insufficient remaining amount of battery is detected for a first wireless communication terminal used by a first user for whom a ride reservation for a vehicle is established with a driver of the vehicle, a process regarding a meet-up schedule of the driver and the first user of the ride reservation.

Another aspect of the present disclosure is an information processing system comprising a controller configured to perform, when a possibility of communication interruption due to an insufficient remaining amount of battery is detected for a first wireless communication terminal used by a first user for whom a ride reservation for a vehicle is established with a driver of the vehicle, a process regarding a meet-up schedule of the driver and the first user of the ride reservation.

Another aspect of the present disclosure is an information processing method comprising:

detecting a possibility of communication interruption due to an insufficient remaining amount of battery, for a first wireless communication terminal used by a first user for whom a ride reservation for a vehicle is established with a driver of the vehicle; and performing, when where the possibility of communication interruption due to the insufficient remaining amount of battery is detected for the first wireless communication terminal, a process regarding a meet-up schedule of the driver and the first user of the ride reservation.

Another aspect of the present disclosure is a non-transitory computer-readable medium recorded with an information processing program for causing a computer to perform, when a possibility of communication interruption due to an insufficient remaining amount of battery is detected for a first wireless communication terminal used by a first user for whom a ride reservation for a vehicle is established with a driver of the vehicle, a process regarding a meet-up schedule of the driver and the first user of the ride reservation.

According to the present disclosure, it is possible to avoid a trouble that is expected to arise, regarding meeting up of a driver of a vehicle and a first user for whom a ride reservation for the vehicle is established, because of an insufficient remaining amount of battery in a wireless communication terminal that is used by the first user.

BRIEF DESCRIPTION OF DRAWINGS

FIG. 4 illustrates an example of a reservation information table;

DESCRIPTION OF THE EMBODIMENTS

Figure 1:
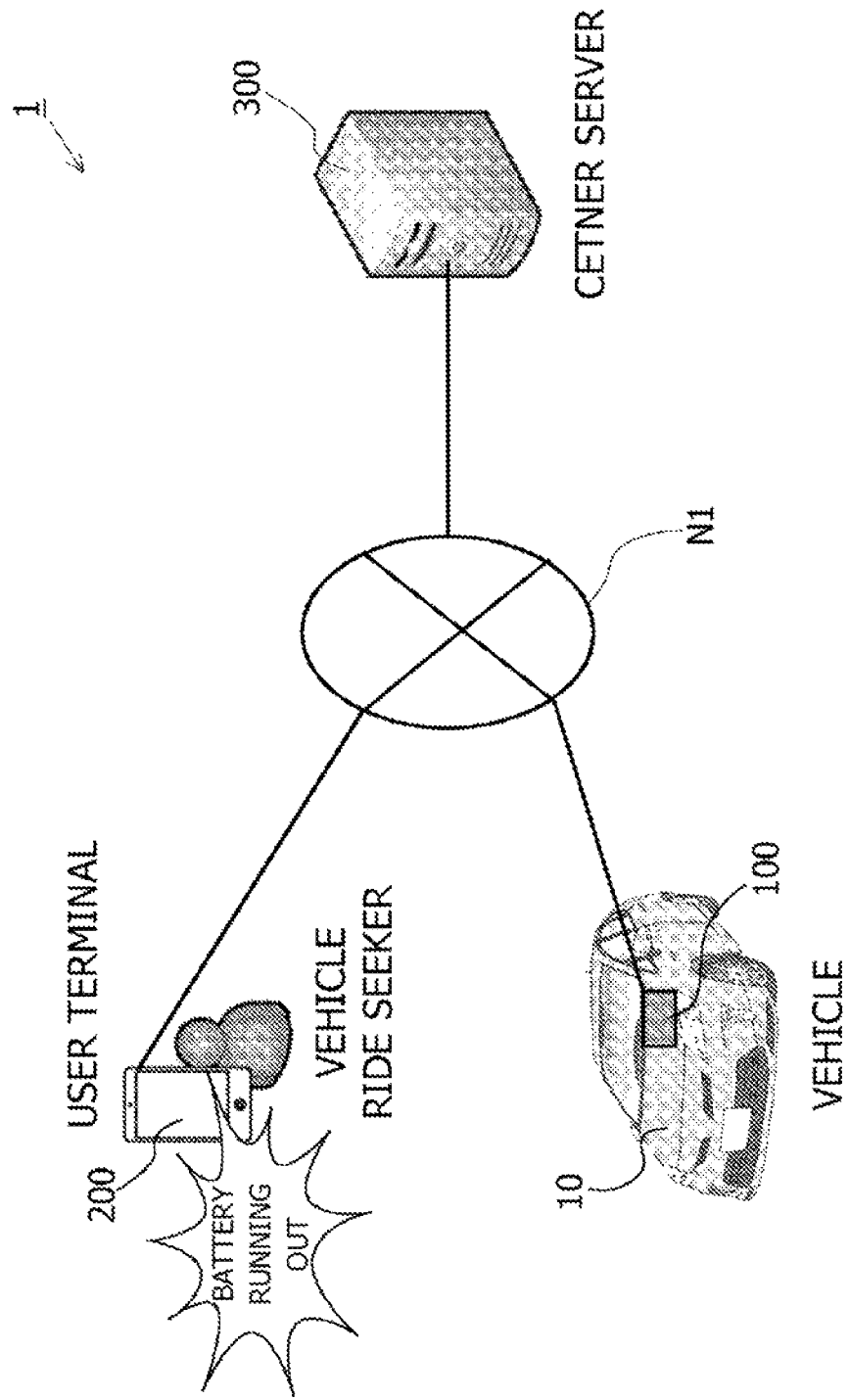
FIG. 1 is a diagram illustrating an example of a system configuration of a ride-sharing service providing system according to a first embodiment.

Hereinafter, an embodiment of the present disclosure will be described with reference to the drawings. The configuration of the following embodiment is merely an example, and the present disclosure is not limited to the configuration of the embodiment.

One aspect of the present disclosure is an information processing apparatus comprising a controller configured to perform, when a possibility of communication interruption due to an insufficient remaining amount of battery is detected for a first wireless communication terminal used by a first user for whom a ride reservation for a vehicle is established with a driver of the vehicle, a process regarding a meet-up schedule of the driver and the first user of the ride reservation.

With respect to a ride reservation for a vehicle, at the time of the driver and the first user meeting up with each other, the first user conceivably contacts the driver using the first wireless communication terminal, for example. In the case where the driver and the first user are strangers, it is important to contact each other through the first wireless communication terminal for the two parties to meet up. However, the first wireless communication terminal of the first user uses a battery as a power source, and when the remaining amount of battery becomes insufficient, the first wireless communication terminal stops operating, and in this case, the first user often loses a means of contact with the driver. Therefore, a trouble that the first user and the driver are not able to meet up, or a trouble that the driver moves needlessly to a scheduled meet-up location is possibly caused.

According to an aspect of the present disclosure, in a case where a possibility of communication interruption due to an insufficient remaining amount of battery in the first wireless communication terminal is detected, the information processing apparatus performs a process regarding a meet-up schedule of the driver and the first user. A trouble that is caused with respect to meeting up of a driver and a first user of a ride reservation may thereby be avoided.

According to an aspect of the present disclosure, the controller may perform detection of the possibility of communication interruption due to the insufficient remaining amount of battery, by detecting interruption of communication with the first wireless communication terminal that continues for a first time length or longer, and may perform, as the process regarding the meet-up schedule, cancellation of the ride reservation. Accordingly, for example, in a situation where the driver and the first user are not able to meet up, a trouble that the driver moves needlessly to the scheduled meet-up location may be avoided, and a burden on the driver may be reduced. The burden on the driver in this case may be a cost of gasoline for movement by the vehicle, time, and labor, for example.

According to another aspect of the present disclosure, the controller may perform detection of the possibility of communication interruption due to the insufficient remaining amount of battery, by detecting interruption of communication with the first wireless communication terminal that continues for a first time length or longer, and may perform, as the process regarding the meet-up schedule, change of a scheduled meet-up location according to the meet-up schedule to a predetermined location. A change destination of the scheduled meet-up location is a predetermined location that is possibly an existing location of the first user, for example. More specifically, the change destination of the scheduled meet-up location is a location indicated by position information that is last received from the first wireless communication terminal, or a position of the first wireless communication terminal after a predetermined period of time that is estimated from position information that is received from the first wireless communication terminal every predetermined period, for example. Accordingly, even if the first wireless communication terminal stops operation because of an insufficient remaining amount of battery, the driver heads to a predetermined location that is possibly the existing location of the first user, and thus, a possibility of the first user and the driver meeting up may be increased.

According to another aspect of the present disclosure, the controller may perform, in a case where interruption of communication with the first wireless communication terminal is detected continuously for a second time length or longer, change of a schedule meet-up location according to the meet-up schedule to a predetermined location that is possibly an existing location of the first user, where the second time length is shorter than the first time length, and then, when the first time length elapses while communication with the first wireless communication terminal is still interrupted, the controller may cancel the ride reservation. Accordingly, cancellation of the ride reservation may be prevented in a case where communication with the first wireless communication terminal is interrupted once but is then restored. A case where communication with the first wireless communication terminal is interrupted once but is then restored is a case where charging is swiftly performed by the first user and operation of the first wireless communication terminal is restarted after the remaining amount of battery in the first wireless communication terminal becomes zero, or a case where the first wireless communication terminal moves out of a communication range but then moves into the communication range, for example. Moreover, for example, when a scheduled meet-up time is reached after the second time length or longer but less than the first time length from interruption of communication with the first wireless communication terminal, and the driver moves to a predetermined location that is possibly an existing location of the first user, the possibility of the first user and the driver meeting up may be increased.

According to another aspect of the present disclosure, the controller may perform detection of the possibility of communication interruption due to the insufficient remaining amount of battery, by detecting that a remaining amount of battery in the first wireless communication terminal is below a first threshold, and may perform, as the process regarding the meet-up schedule, change of a scheduled meet-up location according to the meet-up schedule to a predetermined location where the first user and the driver can meet up before the first wireless communication terminal stops operation because of the insufficient remaining amount of battery, and notification of the scheduled meet-up location after change to a wireless communication terminal that is used by the driver. The possibility of the driver and the first user meeting up while the first wireless communication terminal is operating may thereby be increased.

According to another aspect of the present disclosure, the controller may further perform transmission, to the first wireless communication terminal, of options for the process regarding the meet-up schedule, in a case where a remaining amount of battery in the first wireless communication terminal is detected to be below a second threshold, and may perform a process selected by the first user from the options, in a case where the possibility of communication interruption due to the insufficient remaining amount of battery is detected for the first wireless communication terminal. The second threshold for the remaining amount of battery in the first wireless communication terminal is a value at or below the first threshold, for example. By causing the first user to select the process regarding the meet-up schedule, the first user may grasp how the system will handle the situation when the first wireless communication terminal stops operation because of the insufficient remaining amount of battery, for example, and occurrence of a trouble regarding meeting up with the driver may be suppressed.

According to another aspect of the present disclosure, the controller may perform detection of the possibility of communication interruption due to the insufficient amount of battery, by detecting that a remaining amount of battery in the first wireless communication terminal is below a first threshold, and may change turns in an order of meet-up in such a way that the first user comes first, in a case where the remaining amount of battery in the first wireless communication terminal is below the first threshold, and there is a second user whose riding period on the vehicle overlaps the riding period of the first user and whose turn in the order of meet-up with the driver comes before the turn of the first user. Accordingly, even if there is a second user, the turn of the first user in the order of meet-up with the driver is prioritized when the remaining amount of battery in the first wireless communication terminal becomes low, and the possibility of the first user meeting up with the driver before the first wireless communication terminal stops operation because of the insufficient remaining amount of battery may be increased.

According to another aspect of the present disclosure, in a case where a change in the scheduled meet-up location causes an increase in a traveling distance and/or a traveling time of the vehicle relative to before the change, the controller may provide a predetermined incentive to the driver according to an amount of the increase. Accordingly, compensation measures may be taken for an increase in the burden on the driver caused by an increase in the traveling distance and/or the traveling time due to a change in the scheduled meet-up location or a change in the turns in the order of meet-up.

First Embodiment

FIG. 1 is a diagram illustrating an example of a system configuration of a ride-sharing service providing system 1 according to a first embodiment. The ride-sharing service providing system 1 is a system that provides a service of joining a driver wishing to share a ride on a vehicle and a vehicle ride seeker wishing to ride in a vehicle, based on destinations, desired traveling times and the like of the two parties, for example, and of providing the vehicle ride seeker with means of transport and the driver with an incentive. Joining of a driver wishing to share a ride on a vehicle and a vehicle ride seeker wishing to ride in a vehicle in such a way that their respective conditions are satisfied will be referred to below as "matching".

The ride-sharing service providing system 1 includes vehicles 10 to be driven by a plurality of drivers, user terminals 200 of a plurality of vehicle ride seekers, and a center server 300. FIG. 1 extracts and illustrates one each of the vehicles 10 and the user terminals 200. An in-vehicle device 100 is installed in the vehicle 10.

In the first embodiment, the user terminal 200 is a portable computer that is capable of wireless communication. Specifically, the user terminal 200 is a smartphone, a tablet terminal, a mobile phone terminal, or a notebook personal computer (PC), for example. The in-vehicle device 100 is a computer that is capable of wireless communication and that can be installed in a vehicle. Specifically, the in-vehicle device 100 is a data communication device dedicated to being installed in a vehicle, a car navigation system, a smartphone, or a tablet terminal, for example. In the first embodiment, the in-vehicle device 100 is assumed to be a data communication device.

The in-vehicle device 100, the user terminal 200, and the center server 300 are connected to a network N1. The network N1 is a public communication network such as the Internet, for example. The in-vehicle device 100 and the user terminal 200 are capable of communicating with the center server 300 through the network N1. The center server 300 is an example of "information processing apparatus". The in-vehicle device 100 and the user terminal 200 are each an example of "wireless communication terminal".

An application for receiving a ride-sharing service is installed in the user terminal 200 of the vehicle ride seeker, for example. The vehicle ride seeker transmits information about the vehicle ride seeker and a ride request to the center server 300 by activating the application on the user terminal 200 and operating the application, for example. A boarding location, an alighting location, a desired traveling time and the like are also transmitted together with the ride request, for example.

An application for receiving the ride-sharing service is also installed in the in-vehicle device 100, for example. The driver transmits information about the driver and the vehicle 10 to the center server 300 by activating the application on the in-vehicle device 100 and operating the application.

The center server 300 receives registration of information from the in-vehicle device 100 and the user terminal 200 registered for the ride-sharing service, for example. Identification information of the vehicle ride seeker and the driver is registered in the center server 300 and the like, for example.

The center server 300 receives, from the user terminal 200 of the vehicle ride seeker, a ride reservation request requesting for a reservation of a ride in the vehicle 10 by ride-sharing. When the ride reservation request is received, the center server 300 performs matching of the vehicle ride seeker and a driver. Any known technique may be used as the method of matching. For example, the center server 300 selects a matching counterpart of the vehicle ride seeker from drivers whose planned traveling routes contain at least one of a boarding location and an alighting location of the vehicle ride seeker, and whose scheduled traveling times on the planned traveling routes contain a desired traveling time of the vehicle ride seeker.

When matching is complete, the center server 300 transmits the ride reservation request to the in-vehicle device 100 that is associated with the matched driver. A scheduled meet-up location and a scheduled meet-up time for the vehicle ride seeker, a desired alighting location of the vehicle ride seeker, information about the vehicle ride seeker, and the like are also transmitted to the in-vehicle device 100, together with the ride reservation request. The scheduled meet-up location, the scheduled meet-up time, and the like are calculated by the center server 300, for example. When an OK response for the ride reservation request is returned from the in-vehicle device 100, the center server 300 determines reservation establishment for the ride reservation request from the user terminal 200 of the vehicle ride seeker, and transmits a ride reservation establishment notification to the user terminal 200.

For example, when a time point that is a predetermined time before a meet-up time point of the ride reservation arrives, the in-vehicle device 100 and the user terminal 200 each start transmission of position information to the center server 300, which is to be performed every predetermined period. For example, the center server 300 monitors positions of the in-vehicle device 100 and the user terminal 200 based on the position information received from the in-vehicle device 100 and the user terminal 200. For example, when detecting entering of the in-vehicle device 100 and the user terminal 200 into a predetermined range of the scheduled meet-up location, the center server 300 transmits, to the in-vehicle device 100 and the user terminal 200, approach notifications regarding the counterparts to thereby support meeting up of the driver and vehicle ride seeker.

However, the user terminal 200 of the vehicle ride seeker is often a so-called mobile device, for example, and uses a battery as a power source in many cases. Accordingly, the user terminal 200 possibly stops operation because of an insufficient remaining amount of battery just before the scheduled meet-up with the driver, for example. When the user terminal 200 stops operation just before the scheduled meet-up with the driver, a meet-up support by the center server 300 might not be received, or a means of contact with the driver may become lost, for example, and the vehicle ride seeker and the driver are highly possibly not able to meet up with each other.

For example, in a case where the vehicle ride seeker and the driver are not able to meet up because of the battery of the user terminal 200 running out, even if the driver moves to arrive at the scheduled meet-up location at the scheduled meet-up time, such movement is performed needlessly, and the burden on the driver regarding time, labor, and cost is great. Additionally, the same problem may occur also in the case where the in-vehicle device 100 is a mobile terminal such as a smartphone.

In the first embodiment, the user terminal 200 transmits, together with the position information, information about the remaining amount of battery to the center server 300 every predetermined period. For example, the center server 300 monitors the information about the remaining amount of battery from the user terminal 200, and detects communication interruption caused by an insufficient remaining amount of battery in the user terminal 200. In the case where communication interruption caused by an insufficient remaining amount of battery in the user terminal 200 is detected, the center server 300 cancels the ride reservation between the vehicle ride seeker and the driver. Accordingly, the driver does not have to move to the scheduled meet-up location, and the burden on the driver may be reduced.

Figure 2:
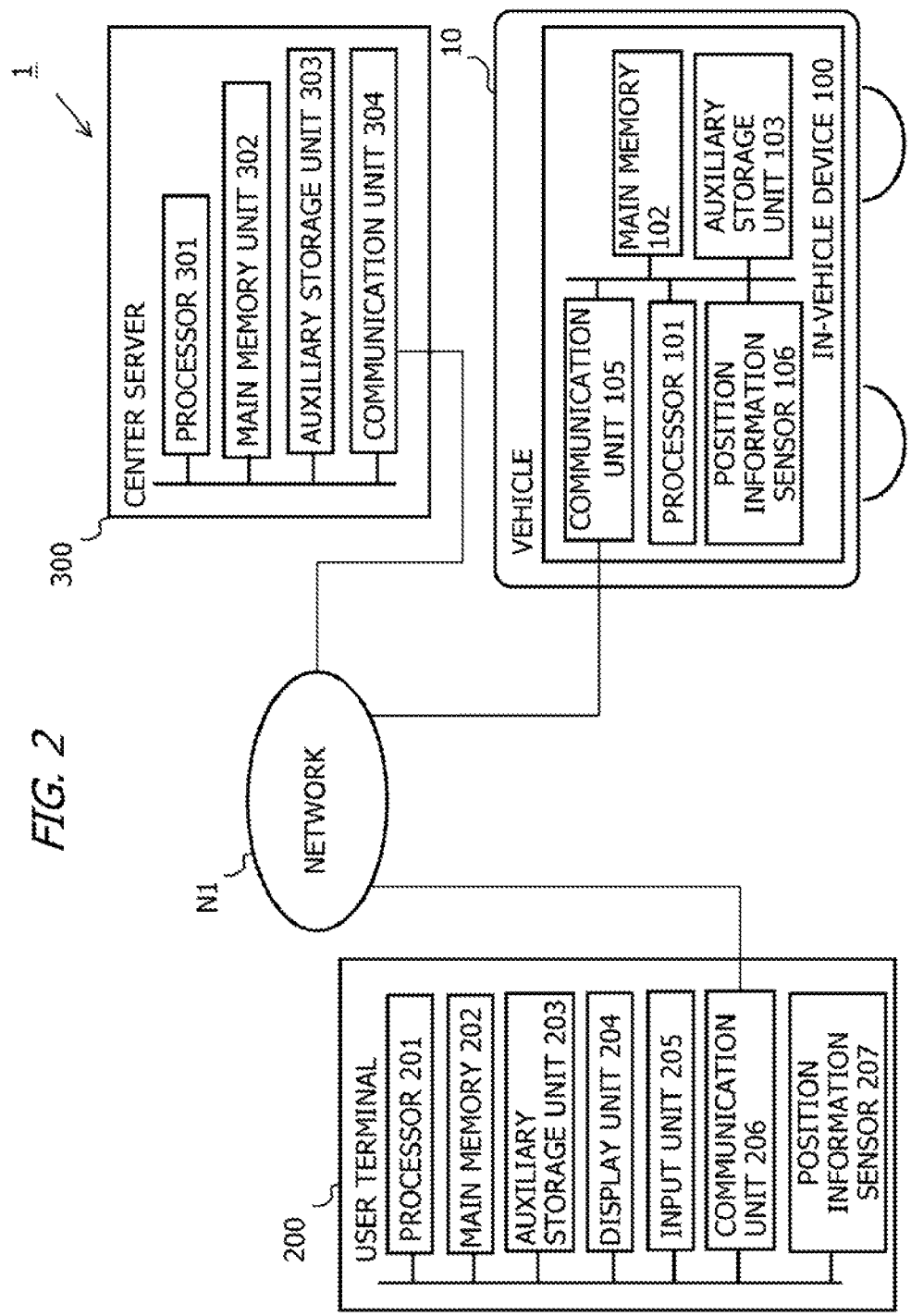
FIG. 2 is a diagram illustrating an example of respective hardware configuration of the in-vehicle device, the user terminal, and the center server.

FIG. 2 is a diagram illustrating an example of respective hardware configuration of the in-vehicle device 100, the user terminal 200, and the center server 300. For example, the center server 300 is a general-purpose or dedicated computer. The center server 300 includes, as hardware components, a processor 301, a main memory unit 302, an auxiliary storage unit 303, and a communication unit 304. These are interconnected by a bus.

The processor 301 is a central processing unit (CPU), for example. The processor 301 executes a computer program that is loaded into the main memory unit 302 in an executable manner, and performs processing as the center server 300. The processor 301 provided in the center server 300 is not limited to a single processor, and may adopt a multi-processor configuration. Alternatively, a single CPU connected by a single socket may have a multicore configuration. At least a part of processes by the center server 300 may be performed by a processor other than the CPU, such as a dedicated processor such as a digital signal processor (DSP) or a graphics processing unit (GPU). At least a part of processes by the center server 300 may be performed by an integrated circuit (IC), another digital circuit, or another analog circuit. The processor 301 is an example of "controller" of "information processing apparatus".

The main memory unit 302 stores computer programs to be executed by the processor 301, data to be processed by the processor 301, and the like. For example, the main memory unit 302 is a dynamic random access memory (DRAM), a static random access memory (SRAM), or a read only memory (ROM). The auxiliary storage unit 303 is a non-volatile memory, and is a hard disk drive, a solid state drive (SSD), or the like. The auxiliary storage unit 303 stores computer programs which are yet to be loaded into the main memory unit 302, various pieces of data, and the like. Programs which are stored in the auxiliary storage unit 303 include an operation system (OS), a ride-sharing control program, and the like, for example. The ride-sharing control program is a program for causing a computer to perform the processing of the center server 300 in the ride-sharing service providing system 1.

For example, the communication unit 304 connects to the network N1 through a local area network (LAN), and communicates with the in-vehicle device 100, the user terminal 200 and the like through the network N1.

The hardware configuration of the center server 300 is not limited to the configuration illustrated in FIG. 2. For example, the center server 300 is capable of reading a program recorded in a removable recording medium, of loading the program into the main memory unit 302, and of executing the program. For example, the removable recording medium is a universal serial bus (USB) memory, or a disk recording medium such as a compact disc (CD), a digital versatile disc (DVD) or a Blu-ray (registered trademark) disc.

For example, the user terminal 200 is a small computer such as a smartphone, a mobile phone terminal, a tablet terminal, a personal digital assistant, or a wearable computer (such as a smartwatch). The user terminal 200 may be a PC. A description is given with reference to FIG. 2, assuming that the user terminal 200 is a smartphone.

The user terminal 200 includes a processor 201, a main memory unit 202, an auxiliary storage unit 203, a display unit 204, an input unit 205, a communication unit 206, and a position information sensor 207. Descriptions of the processor 201, the main memory unit 202, and the auxiliary storage unit 203 are the same as the descriptions of the processor 301, the main memory unit 302, and the auxiliary storage unit 303 of the center server 300, and descriptions thereof are omitted. Note that an application program for receiving the ride-sharing service is stored in the auxiliary storage unit 203 of the user terminal 200.

For example, the display unit 204 is a liquid crystal display (LCD) or an electroluminescence (EL) panel. The input unit 205 includes a touch panel, a push button, and the like. The input unit 205 further includes a camera to enable input of videos and images. The input unit 205 may further include an input unit for audio, such as a microphone.

For example, the communication unit 206 is a communication unit which is compatible with a communication scheme adopted by a private network such as WiFi, or by a carrier network such as 3G, LTE, LTE-Advanced, or 5G. The communication unit 206 connects to the network N1 through an access network such as a WiFi network or a carrier network, and performs communication with the center server 300 and the like, for example.

The position information sensor 207 acquires position information of the user terminal 200 every predetermined period. For example, the position information sensor 207 is a global positioning system (GPS) receiver, a WiFi communication unit, or the like. The hardware configuration of the user terminal 200 is not limited to the configuration illustrated in FIG. 2.

The in-vehicle device 100 includes a processor 101, a main memory unit 102, an auxiliary storage unit 103, a communication unit 105, and a position information sensor 106. Descriptions of the processor 101, the main memory unit 102, the auxiliary storage unit 103, the communication unit 105, and the position information sensor 106 are the same as the descriptions of the processor 301, the main memory unit 302, the auxiliary storage unit 303, the communication unit 206, and the position information sensor 207, and are thus omitted. Note that an application program for receiving the ride-sharing service is stored in the auxiliary storage unit 103 of the in-vehicle device 100.

The network N1 is a worldwide public communication network such as the Internet, but a wide area network (WAN) or other communication networks may also be adopted, for example. The network N1 may include telephone communication network for mobile phones, and a wireless communication network such as WiFi.

Figure 3:
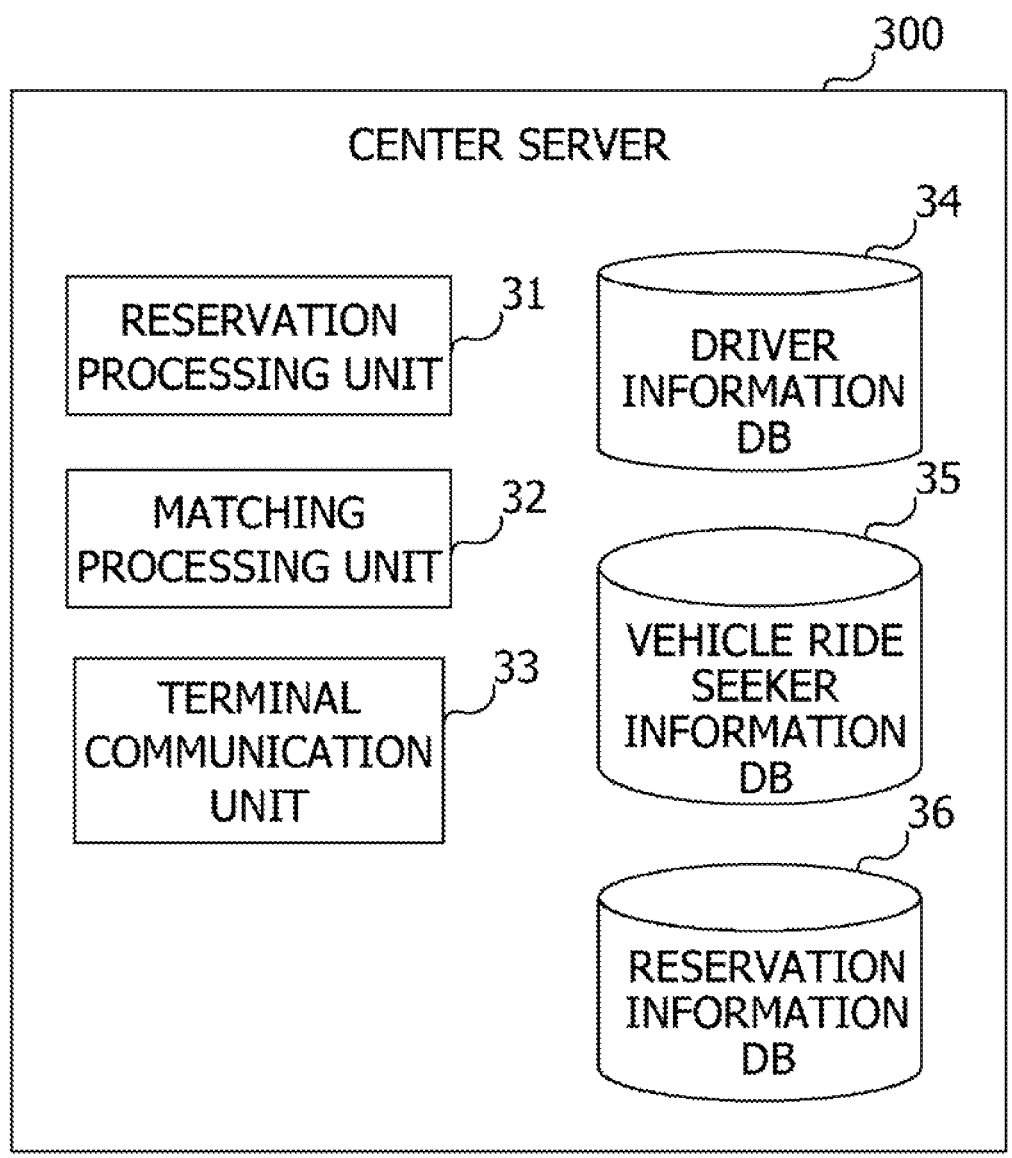
FIG. 3 is a diagram illustrating an example of a functional configuration of the center server.

FIG. 3 is a diagram illustrating an example of a functional configuration of the center server 300. As functional components, the center server 300 includes a reservation processing unit 31, a matching processing unit 32, a terminal communication unit 33, a driver information database (DB) 34, a vehicle ride seeker information DB 35, and a reservation information DB 36. These functional components are functional components that are achieved by the processor 301 of the center server 300 executing the ride-sharing control program that is stored in the auxiliary storage unit 303, for example. However, any of the functional components, or a part of processes thereof may be executed by a hardware circuit.

The terminal communication unit 33 is an interface to the in-vehicle device 100 and the user terminal 200. The terminal communication unit 33 performs transmission/reception of data with the in-vehicle device 100 and the user terminal 200 through the communication unit 304. Specifically, the terminal communication unit 33 receives a ride reservation request from the user terminal 200, and outputs the ride reservation request to the reservation processing unit 31, for example. For example, the terminal communication unit 33 receives the position information from the in-vehicle device 100, and the position information and information about the remaining amount of battery from the user terminal 200, and outputs the pieces of information to the reservation processing unit 31. For example, information about the remaining amount of battery is a percentage of a current amount of stored power to an amount of power in a fully charged state, or the current amount of stored power, for example.

The reservation processing unit 31 performs control regarding ride reservation. Specifically, the reservation processing unit 31 receives a ride reservation request from the user terminal 200 through the terminal communication unit 33. A desired boarding location, a desired alighting location, and a desired traveling time are also received from the user terminal 200, together with the ride reservation request.

In the case where the ride reservation request is received from the user terminal 200, the reservation processing unit 31 requests the matching processing unit 32 for matching. The reservation processing unit 31 receives, from the matching processing unit 32, input of information about a driver matched with the vehicle ride seeker of the user terminal 200, a scheduled meet-up location, and a scheduled meet-up time. The reservation processing unit 31 transmits, through the terminal communication unit 33, the ride reservation request to the in-vehicle device 100 corresponding to the driver matched with the vehicle ride seeker of the user terminal 200. Ride reservation information is also transmitted together with the ride reservation request. For example, the ride reservation information includes the scheduled meet-up location and the scheduled meet-up time, a desired alighting location and a desired arrival time of the vehicle ride seeker, and information about the vehicle ride seeker. The information about the vehicle ride seeker included in the ride reservation information includes a user ID, attribute and the like of the vehicle ride seeker, for example.

In the case where an OK response for the ride reservation request is received from the in-vehicle device 100 through the terminal communication unit 33, the reservation processing unit 31 determines that the ride reservation is established, and registers the ride reservation information in the reservation information DB 36.

The reservation processing unit 31 transmits a ride reservation establishment notification to the user terminal 200, which is a source of the ride reservation request, through the terminal communication unit 33. For example, the scheduled meet-up location, the scheduled meet-up time, and the information about the driver are also transmitted together with the ride reservation establishment notification. The information about the driver includes a user ID and an attribute of the driver, information about the vehicle 10, and the like, for example.

For example, when a time point that is a predetermined time before the scheduled meet-up time of the ride reservation arrives, the reservation processing unit 31 starts a meet-up supporting process. The meet-up supporting process is a process for supporting meeting up of the driver and the vehicle ride seeker between whom the ride reservation is established. A time point when the meet-up supporting process is started is a time point such as 10 minutes, 15 minutes or 30 minutes before the scheduled meet-up time of the ride reservation, for example. A start timing of the meet-up supporting process may be set by any of an administrator of the ride-sharing service providing system 1, the vehicle ride seeker, or the driver, for example. Specifically, the meet-up supporting process is as follows.

The reservation processing unit 31 receives, every predetermined period, the position information of the in-vehicle device 100 and the user terminal 200, from the in-vehicle device 100 and the user terminal 200 used, respectively, by the driver and the vehicle ride seeker for whom a ride reservation is established, and grasps the position information of the two parties. For example, the reservation processing unit 31 cause the position information of each of the in-vehicle device 100 and the user terminal 200 to be buffered in the main memory unit 302 for a predetermined period of time or by a predetermined number of pieces. For example, when entering of the user terminal 200 of the vehicle ride seeker and the in-vehicle device 100 of the driver into a predetermined range of the scheduled meet-up location is detected, the reservation processing unit 31 transmits an approach notification to the two parties.

The reservation processing unit 31 also receives information about the remaining amount of battery from the user terminal 200 every predetermined period. For example, the reservation processing unit 31 causes the information about the remaining amount of battery in the user terminal 200 to be buffered in the main memory unit 302 for a predetermined period of time or by a predetermined number of pieces.

In the first embodiment, when the possibility of interruption of communication due to an insufficient remaining amount of battery in the user terminal 200 is detected, the reservation processing unit 31 cancels the ride reservation between the vehicle ride seeker of the user terminal 200 and the driver, and notifies the in-vehicle device 100 of the driver of cancellation of the ride reservation. For example, in the first embodiment, the possibility of interruption of communication due to an insufficient remaining amount of battery in the user terminal 200 is detected when a battery runout determination condition 1 is satisfied. For example, the battery runout determination condition 1 is that the position information and/or information about the remaining amount of battery are/is not received from the user terminal 200 after a lapse of a time length T1 or longer, or disconnection of a session with the user terminal 200 for the time length T1 or longer. The time length T1 is set within a range of several minutes to one hour, for example, but such a range is not restrictive. Furthermore, the battery runout determination condition 1 may be satisfaction of both of one of the conditions described above and a latest received remaining amount of battery being below a predetermined threshold.

The matching processing unit 32 performs, in response to a request from the reservation processing unit 31, matching of the vehicle ride seeker of the user terminal 200 which is the source of the ride reservation request, and a driver. A matching method adopted by the matching processing unit 32 may be any of known techniques, and is not limited to a specific method. For example, the matching processing unit 32 extracts, from the driver information DB 34 described later, a driver whose scheduled traveling time contains the desired traveling time in the ride reservation request, and whose travel plan contains, near a destination or a via point and in vicinities thereof, the desired boarding location and the desired alighting location of the vehicle ride seeker. The matching processing unit 32 selects, from extracted drivers, a matching counterpart of the vehicle ride seeker, randomly or based on an evaluation value, the attribute or the like, for example.

The matching processing unit 32 also determines the scheduled meet-up location based on the desired boarding location and the desired alighting location of the vehicle ride seeker and the destination and the via point of the driver. The matching processing unit 32 further determines the scheduled meet-up time based on the desired traveling time of the vehicle ride seeker and the scheduled traveling time of the driver. Methods of determining the scheduled meet-up location and the scheduled meet-up time may be any of known techniques, and are not limited to specific methods. The matching processing unit 32 outputs, to the reservation processing unit 31, information about the selected driver, the scheduled meet-up location, the scheduled meet-up time, and the like.

The driver information DB 34, the vehicle ride seeker information DB 35, and the reservation information DB 36 are each constructed by management of data, stored in the auxiliary storage unit 303, by a program in a database management system (DBMS) executed by the processor 301, for example. The driver information DB 34, the vehicle ride seeker information DB 35, and the reservation information DB 36 are relational databases, for example.

The driver information DB 34 includes information about a driver. Information about a driver includes a user ID of the driver, an in-vehicle device ID, attribute information of the driver, contact information of the driver, a vehicle ID, external appearance information of the vehicle, a maximum number of passengers of the vehicle, and information about a travel plan of the driver, for example. Attributes of the driver include information about gender, age, a resident district, and the like, for example. The external appearance information of the vehicle includes information about a model and a color of the vehicle, a license number, and the like, for example. The information about a travel plan of the driver includes information about the scheduled traveling time, a departure point, a destination, a via point, and the like.

The information stored in the driver information DB 34 is information that is registered by a driver through the in-vehicle device 100 or the like, for example. The information about a driver stored in the driver information DB 34 is used by the matching processing unit 32 at the time of matching, for example. The information about a driver who is selected as the matching counterpart of a vehicle ride seeker is read from the driver information DB 34, is notified to the reservation processing unit 31 by the matching processing unit 32, and is notified to the user terminal 200 together with the ride reservation establishment notification, for example. The information, about a driver who is selected as the matching counterpart of a vehicle ride seeker, which is notified to the user terminal 200 together with the ride reservation establishment notification may be all or a part of information about the driver that is held in the driver information DB 34, for example.

The vehicle ride seeker information DB 35 includes information about a vehicle ride seeker. Information about a vehicle ride seeker includes a user ID of the vehicle ride seeker, an ID of the user terminal 200, attribute information of the vehicle ride seeker, and contact information of the vehicle ride seeker, for example. Attributes of the vehicle ride seeker include information about gender, age, a resident district, and the like, for example.

The information stored in the vehicle ride seeker information DB 35 is information registered by a vehicle ride seeker through the user terminal 200, for example. The information about a vehicle ride seeker stored in the vehicle ride seeker information DB 35 is used by the matching processing unit 32 at the time of matching, for example. The information about a vehicle ride seeker is read from the vehicle ride seeker information DB 35, is notified to the reservation processing unit 31 by the matching processing unit 32, and is notified to the in-vehicle device 100 together with the ride reservation request, for example. The information about a vehicle ride seeker which is notified to the in-vehicle device 100 together with the ride reservation request, for example, may be all or a part of information about the vehicle ride seeker held in the vehicle ride seeker information DB 35.

FIG. 4 illustrates an example of a reservation information table. The reservation information table is a table that is held in the reservation information DB 36. The reservation information table is a table that holds information about a ride reservation.

The reservation information table illustrated in FIG. 4 contains fields of a driver ID, a vehicle ride seeker ID, a vehicle number, a scheduled meet-up location, a scheduled meet-up time, a desired alighting location of a vehicle ride seeker, a desired arrival time of a vehicle ride seeker, and ride-sharing passenger presence/absence. In the driver ID field, an ID for identifying a driver is input. In the vehicle ride seeker ID field, an ID for identifying a vehicle ride seeker is input. In the vehicle number field, identification information for identifying the vehicle 10 is input.

In the scheduled meet-up location field, information about a scheduled meet-up location determined by the matching processing unit 32 is input. For example, any of longitude and latitude, an address, a name of a landmark, or the like may be input in the scheduled meet-up location field as information about a scheduled meet-up location. In the scheduled meet-up time field, a scheduled meet-up time determined by the matching processing unit 32 is input.

Information pieces to be stored in the fields of the desired alighting location and the desired arrival time of a vehicle ride seeker are input based on the desired alighting location and the scheduled traveling time which are received together with the ride reservation request from the user terminal 200 of the vehicle ride seeker.

In the ride-sharing passenger presence/absence field, information indicating presence/absence of a ride-sharing passenger is input. Information indicating presence/absence of a ride-sharing passenger is a flag, "YES" or "NO", the vehicle ride seeker ID of the ride-sharing passenger, or the like, for example. Ride-sharing passengers are vehicle ride seekers for whom the driver and at least a part or all of a scheduled riding period (period from the scheduled meet-up time to a desired arrival time) overlap in the ride reservation information, for example. Information pieces stored in the ride-sharing passenger presence/absence fields in newly registered ride reservation information and in the ride reservation information with an overlap are registered or updated, in a case where presence or absence of ride reservation information which partially or wholly overlaps the newly registered ride reservation information with respect to the driver and the scheduled riding period is determined, and is the presence of the ride reservation information with an overlap is determined.

A first entry in the example illustrated in FIG. 4 indicates that a vehicle ride seeker C001 is to meet up with the vehicle 10 which is driven by a driver S001 at a location f at 8:00, and that the driver S001 is to drive the vehicle 10 toward a destination g.

Second and third entries illustrated in FIG. 4 indicate that vehicle ride seekers C002 and C003 overlap each other with respect to the driver S002 and the scheduled riding period between the scheduled meet-up time and the desired arrival time, and that the vehicle ride seekers C002 and C003 are ride-sharing passengers.

Second and third entries in the example illustrated in FIG. 4 indicate that a vehicle ride seeker C002 is to meet up with the vehicle 10 which is driven by a driver S002 at a location h at 8:30, and that the driver S002 is to drive the vehicle 10 toward a location i to further pick up a vehicle ride seeker C003 at the location i at 8:45. It is also indicated that the driver S002 is to drive the vehicle 10 toward a destination j of the vehicle ride seeker C003, to drop off the vehicle ride seeker C003 at the location j, and then, to drive the vehicle 10 toward a destination e of the vehicle ride seeker C002.

Additionally, one or some of the functional components of the center server 300, or a part of processes of the functional components may be implemented by another computer that is connected to the network N1. For example, processes by the reservation processing unit 31 and the matching processing unit 32 may be performed by separate computers.

<Flow of Processing>

Figure 5:
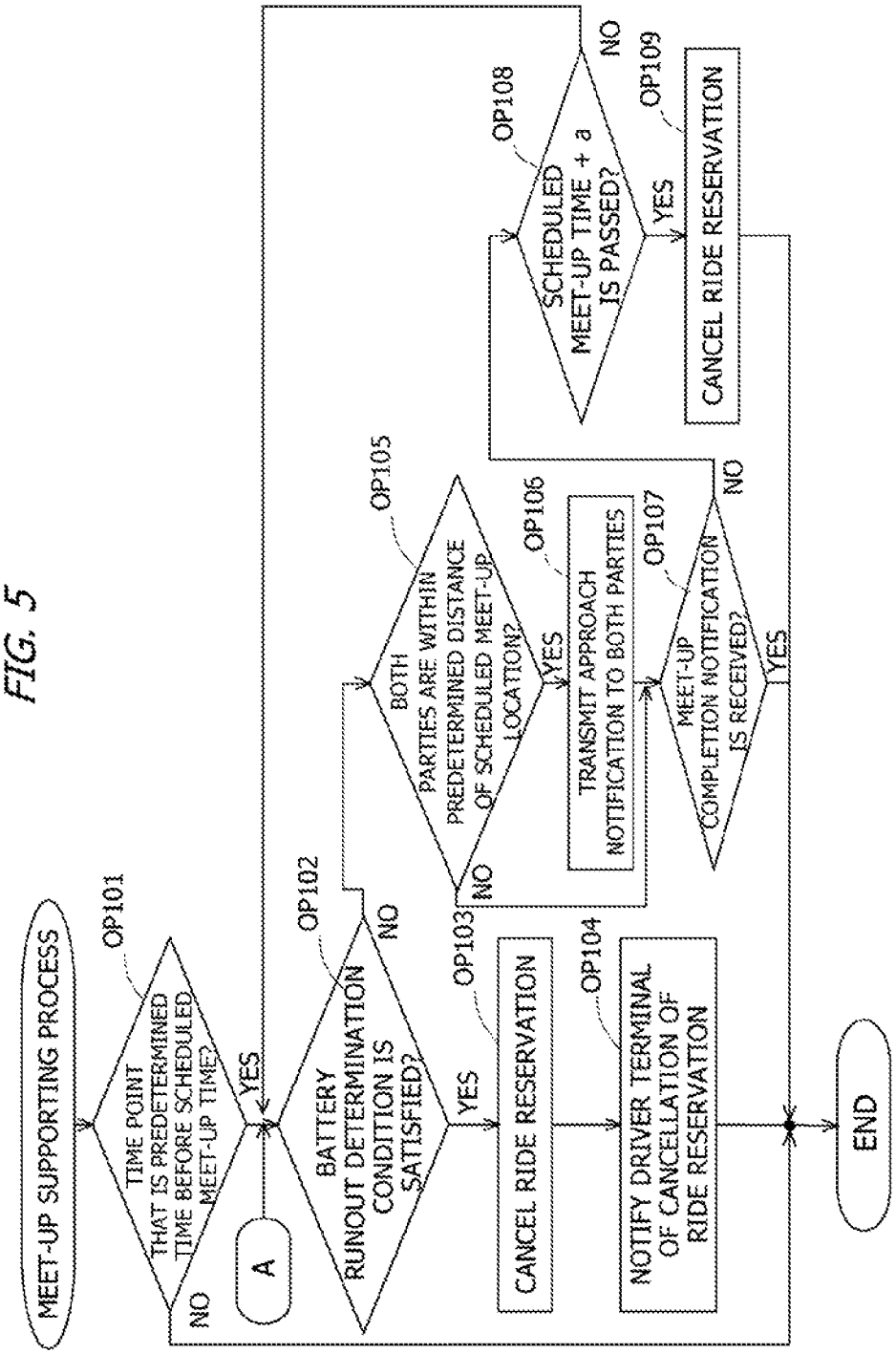
FIG. 5 is an example of a flowchart of the meet-up supporting process by the center server according to the first embodiment.

FIG. 5 is an example of a flowchart of the meet-up supporting process by the center server 300 according to the first embodiment. The process illustrated in FIG. 5 is repeatedly performed every predetermined period for each piece of ride reservation information held in the reservation information DB 36, for example. A performer of the process illustrated in FIG. 5 is the processor 301 of the center server 300, for example, but a description will be given with reference to FIG. 5, taking a functional component as the performer for the sake of convenience. The same applies to the flowcharts following FIG. 5. Hereinafter, in the flowcharts of the meet-up supporting process in FIG. 5 and subsequent drawings, "vehicle ride seeker", "driver", "user terminal 200", and "in-vehicle device 100" refer to the vehicle ride seeker, the driver, the user terminal 200, and the in-vehicle device 100 in the processing target ride reservation information unless otherwise specified. The vehicle ride seeker in the ride reservation information which is the target of processes in the flowcharts of the meet-up supporting process in FIG. 5 and subsequent drawings, and the user terminal 200 of the vehicle ride seeker in question are each an example of "first user" and "first wireless communication terminal". The driver in the ride reservation information which is the target of processes in the flowcharts of the meet-up supporting process in FIG. 5 and subsequent drawings, and the vehicle 10 of the driver in question are each an example of "driver" and "vehicle".

In OP101, the reservation processing unit 31 determines, with respect to target ride reservation information, whether or not a time point that is a predetermined time before the scheduled meet-up time is reached. In the case where a time point that is a predetermined time before the scheduled meet-up time is reached (OP101: YES), the process proceeds to OP102. In the case where a time point that is a predetermined time before the scheduled meet-up time is not yet reached (OP101: NO), the process illustrated in FIG. 5 is ended, and the process illustrated in FIG. 5 is started again after a predetermined period.

In OP102, the reservation processing unit 31 determines whether or not the battery runout determination condition 1 is satisfied. The battery runout determination condition 1 is one of (A) lapse of the time length T1 or longer after the position information and/or information about the remaining amount of battery are/is last received from the user terminal 200, (B) disconnection of a session with the user terminal 200 for the time length T1 or longer, and (C) satisfaction of (A) or (B) and a latest received remaining amount of battery being below a predetermined threshold, for example.

In the case where the battery runout determination condition 1 is satisfied (OP102: YES), the process proceeds to OP103. In the case where the battery runout determination condition 1 is not satisfied (OP102: NO), the process proceeds to OP105. A positive determination in OP102 is an example of "detection of a possibility of communication interruption due to an insufficient remaining amount of battery for a first wireless communication terminal", and "detection of interruption of communication with the first wireless communication terminal that continues for a first time length or longer". The time length T1 is an example of "first time length".

In OP103, because the battery runout determination condition 1 is satisfied, the reservation processing unit 31 cancels the target ride reservation. The process in OP103 is an example of "process regarding a meet-up schedule".

In OP104, the reservation processing unit 31 transmits, to the in-vehicle device 100 of the driver, a notification regarding cancellation of the ride reservation. Corresponding ride reservation information is also transmitted together with the notification regarding cancellation of the ride reservation. Additionally, when a ride reservation is cancelled, information indicating cancellation is added, in the reservation information table, to the corresponding ride reservation information, for example. Then, the process illustrated in FIG. 5 is ended for the target ride reservation information, and the process illustrated in FIG. 5 is thereafter not performed for the target ride reservation information.

Additionally, in the case where communication with the user terminal 200 of the vehicle ride seeker in the cancelled ride reservation information is restarted afterwards, the reservation processing unit 31 may notify the user terminal 200 of cancellation of the ride reservation.

In OP105, because the battery runout determination condition 1 is not satisfied, the reservation processing unit 31 determines whether or not the in-vehicle device 100 of the driver and the user terminal 200 of the vehicle ride seeker are present within a predetermined distance of the scheduled meet-up location. The determination in OP105 is performed based on the position information of the in-vehicle device 100 and the user terminal 200.

In the case where the in-vehicle device 100 of the driver and the user terminal 200 of the vehicle ride seeker are both detected to be present within a predetermined distance of the scheduled meet-up location (OP105: YES), the process proceeds to OP106. In the case where the in-vehicle device 100 of the driver and the user terminal 200 of the vehicle ride seeker are not both detected to be present within a predetermined distance of the scheduled meet-up location (OP105: NO), the process proceeds to OP107.

In OP106, the reservation processing unit 31 transmits an approach notification to the in-vehicle device 100 of the driver and the user terminal 200 of the vehicle ride seeker through the terminal communication unit 33. Then, the process proceeds to OP107.

In OP107, the reservation processing unit 31 determines whether or not a meet-up completion notification is received, through the terminal communication unit 33, from at least one of the in-vehicle device 100 of the driver or the user terminal 200 of the vehicle ride seeker. In the case where a meet-up completion notification is received from at least one of the in-vehicle device 100 of the driver or the user terminal 200 of the vehicle ride seeker (OP107: YES), the process illustrated in FIG. 5 is ended for the target ride reservation information, and the process in FIG. 5 is thereafter not performed for the target ride reservation information. In the case where the meet-up completion notification is received neither from the in-vehicle device 100 of the driver nor the user terminal 200 of the vehicle ride seeker (OP107: NO), the process proceeds to OP108.

In OP108, the reservation processing unit 31 determines whether or not a time corresponding to "scheduled meet-up time+α" is passed. In the case where the time corresponding to "scheduled meet-up time+α" is passed (OP108: YES), the process proceeds to OP109, and in OP109, the reservation processing unit 31 cancels the target ride reservation. At this time, the reservation processing unit 31 may notify the in-vehicle device 100 of the driver of cancellation of the ride reservation. Then, the process illustrated in FIG. 5 is ended.

In the case where the time corresponding to "scheduled meet-up time+α" is not yet reached (OP108: NO), the process proceeds to OP102. Additionally, the meet-up supporting process illustrated in FIG. 5 is merely an example, and the meet-up supporting process by the center server 300 is not limited to the process illustrated in FIG. 5.

<Operations and Effects of First Embodiment>

In the example illustrated in FIG. 5, for example, in the case where the user terminal 200 of the vehicle ride seeker stops operation because of an insufficient remaining amount of battery between a time t1 that is a predetermined time before the scheduled meet-up time and a time t2 that is the time length T1 before "scheduled meet-up time+α" (OP102: YES), the ride reservation is cancelled (OP103). Furthermore, for example, in the case where the user terminal 200 of the vehicle ride seeker stops operation because of an insufficient remaining amount of battery between the time t2 and "scheduled meet-up time+α", if "scheduled meet-up time+α" is reached without the vehicle ride seeker and the driver meeting up (OP108: YES), the ride reservation is cancelled (OP109) even though the battery runout determination condition 1 is not satisfied (OP102: NO).

For example, even if communication with the user terminal 200 is interrupted after the time t1 because of a radio environment or the like, if communication is restored within the time length T1, the battery runout determination condition 1 is not satisfied (OP102: NO), and the ride reservation is not immediately cancelled just because communication with the user terminal 200 is interrupted.

In the first embodiment, the center server 300 cancels a ride reservation when a possibility of communication interruption due to an insufficient remaining amount of battery in the user terminal 200 of the ride reservation is detected at or after a time point that is a predetermined time before the scheduled meet-up time of the ride reservation. Accordingly, the driver for the ride reservation does not have to head to the scheduled meet-up location and does not have to move needlessly, and a burden on the driver may be reduced. Moreover, in the case where the user terminal 200 stops operation because of an insufficient remaining amount of battery, the ride reservation is automatically cancelled, and thus, the vehicle ride seeker does not have to perform a process regarding cancellation of the ride reservation, and also, the vehicle ride seeker does not have to worry needlessly about meet-up with the counterpart driver of the ride reservation. A trouble regarding a meet-up in a ride reservation may thus be avoided.

Second Embodiment

In a second embodiment, in the case where a possibility of communication interruption due to an insufficient remaining amount of battery in the user terminal 200 of a ride reservation is detected at or after a time point that is a predetermined time before the scheduled meet-up time of the ride reservation, the center server 300 performs change of the scheduled meet-up location, as the meet-up supporting process. Because a vehicle ride seeker wishes to move by a vehicle, the vehicle ride seeker in many cases desires the ride reservation to be carried out even if a battery of the user terminal 200 runs out. Accordingly, in the second embodiment, meet-up of the driver and the vehicle ride seeker of a ride reservation is supported also in a case where the user terminal 200 stops operation because of an insufficient remaining amount of battery. Additionally, in the second embodiment, descriptions overlapping those of the first embodiment are omitted. In the second embodiment, the system configuration of the ride-sharing service providing system 1, hardware configurations of the in-vehicle device 100, the user terminal 200, and the center server 300, and the functional configuration of the center server 300 are the same as those of the first embodiment.

Figure 6:
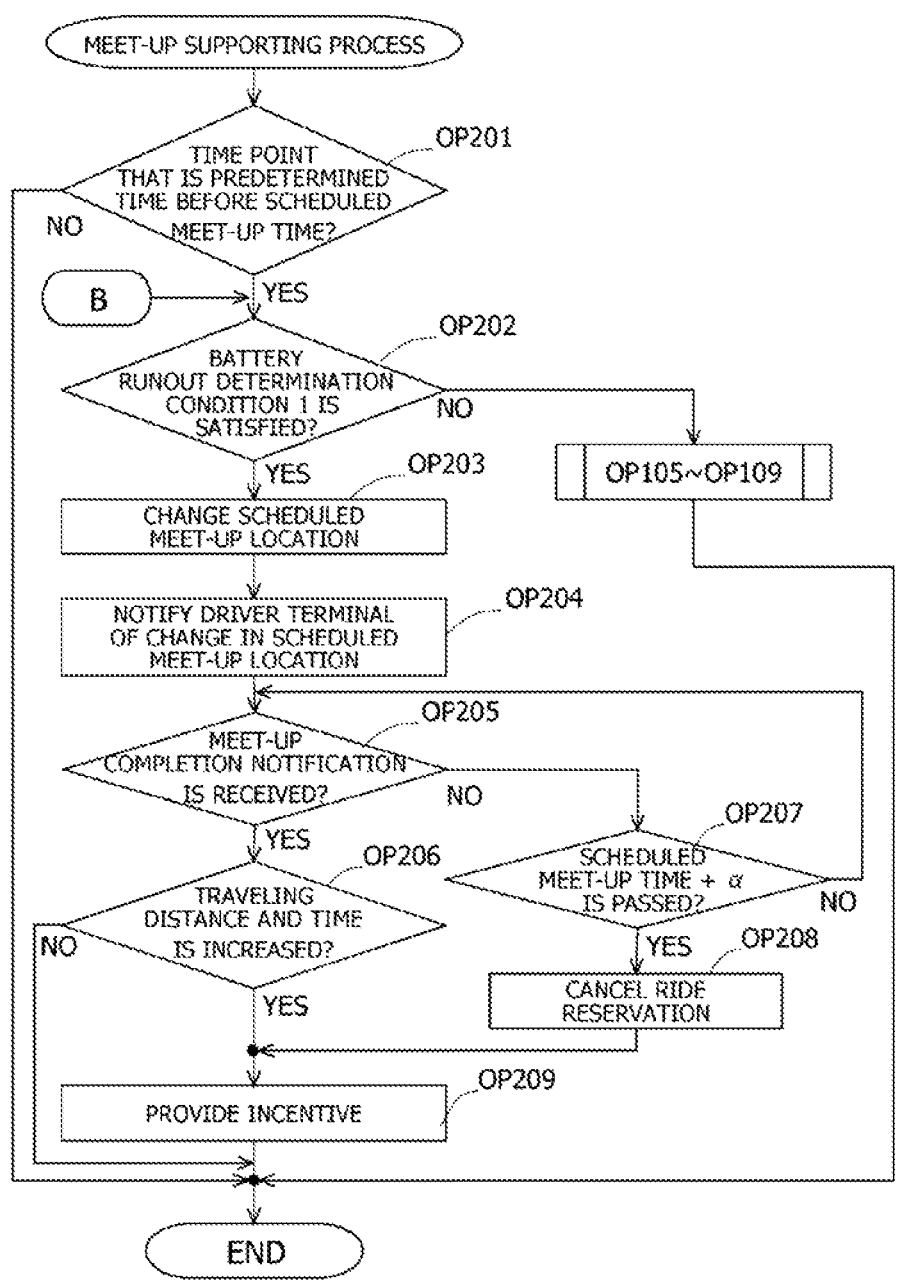
FIG. 6 is an example of a flowchart of the meet-up supporting process by the center server according to the second embodiment.

FIG. 6 is an example of a flowchart of the meet-up supporting process by the center server 300 according to the second embodiment. In the second embodiment, the reservation processing unit 31 of the center server 300 performs the meet-up supporting process illustrated in FIG. 6. The process illustrated in FIG. 6 is repeatedly performed every predetermined period for each piece of ride reservation information held in the reservation information DB 36, for example.

In OP201, the reservation processing unit 31 determines, with respect to target ride reservation information, whether or not a time point that is a predetermined time before the scheduled meet-up time is reached. In the case where the time point that is a predetermined time before the scheduled meet-up time is reached (OP201: YES), the process proceeds to OP202. In the case where the time point that is a predetermined time before the scheduled meet-up time is not yet reached (OP201: NO), the process illustrated in FIG. 6 is ended, and the process illustrated in FIG. 6 is restarted after a predetermined period.

In OP202, the reservation processing unit 31 determines whether or not the battery runout determination condition 1 is satisfied. In the case where the battery runout determination condition 1 is satisfied (OP202: YES), the process proceeds to OP203. In the case where the battery runout determination condition 1 is not satisfied (OP202: NO), processes the same as those in OP105 to OP109 in FIG. 5 are performed. In a case where a negative determination is made in OP108, the process proceeds to OP202. A positive determination in OP202 is an example of "detection of a possibility of communication interruption due to an insufficient remaining amount of battery for a first wireless communication terminal", and "detection of interruption of communication with the first wireless communication terminal that continues for a first time length or longer".

In OP203, the reservation processing unit 31 changes the scheduled meet-up location in the target ride reservation information. The scheduled meet-up location after change is determined to be one of a location specified in advance by the vehicle ride seeker as a candidate meet-up location in case of operation stop of the user terminal 200 due to an insufficient remaining amount of battery, a location indicated by the position information that is last received from the user terminal 200, a position that is estimated from a record of the position information of the user terminal 200 to be the position of the vehicle ride seeker at the schedule meet-up time, and the scheduled meet-up location that is the same as before change, for example.

Which of the locations described above is to be determined as the scheduled meet-up location after change is determined based on a previous agreement with the vehicle ride seeker made at the time of reception of the ride reservation request, for example. Furthermore, in the case where there is no previous agreement with the vehicle ride seeker made at the time of reception of the ride reservation request, the scheduled meet-up location after change is determined to be one of the location indicated by the position information that is last received from the user terminal 200, the position that is estimated from a record of the position information of the user terminal 200 to be the position of the vehicle ride seeker at the schedule meet-up time, and the scheduled meet-up location that is the same as before change, for example. Additionally, the reservation processing unit 31 may also change the scheduled meet-up time, according to the scheduled meet-up location after change. The process in OP203 is an example of "process regarding a meet-up schedule" and "change of a scheduled meet-up location according to the meet-up schedule to a predetermined location that is possibly an existing location of the first user".

In OP204, the reservation processing unit 31 notifies the in-vehicle device 100, of the driver of the target ride reservation information, through the terminal communication unit 33, of the change in the scheduled meet-up location and the scheduled meet-up location determined in OP203.

In OP205, the reservation processing unit 31 determines whether or not the meet-up completion notification is received from the in-vehicle device 100 of the driver through the terminal communication unit 33. In the case where the meet-up completion notification is received from the in-vehicle device 100 (OP205: YES), the process proceeds to OP206. In the case where the meet-up completion notification is not received from the in-vehicle device 100 (OP205: NO), the process proceeds to OP207.

In OP206, the reservation processing unit 31 determines whether or not a traveling distance and/or a traveling time of the vehicle 10 of the driver are/is increased because of the change in the scheduled meet-up location, with respect to movement to the scheduled meet-up location before change, and to movement from the scheduled meet-up location before change to the desired alighting location. Any known technique may be used for calculation of the traveling distance and/or the traveling time of the vehicle 10 of the driver.

In the case where the traveling distance and/or the traveling time of the vehicle 10 of the driver are/is increased (OP206: YES), the process proceeds to OP209, and in OP209, the reservation processing unit 31 provides the driver with an incentive according to the amount of increase in the traveling distance and/or the traveling time. The incentive that is provided to the driver is a point, a coupon, or the like that can be used, in the ride-sharing service providing system 1, when the driver receives a service as a vehicle ride seeker, for example, but is not limited thereto. The process illustrated in FIG. 6 is then ended for the target ride reservation information, and the process illustrated in FIG. 6 is thereafter not performed for the ride reservation information in question.

In the case where the traveling distance and/or the traveling time of the vehicle 10 of the driver are/is not increased (OP206: NO), the process illustrated in FIG. 6 is ended for the target ride reservation information, and the process illustrated in FIG. 6 is thereafter not performed for the ride reservation information in question.

In OP207, the reservation processing unit 31 determines whether or not a time corresponding to "scheduled meet-up time+$\alpha$" is passed. In the case where the time corresponding to "scheduled meet-up time+$\alpha$" is passed (OP207: YES), the process proceeds to OP208, and in OP208, the reservation processing unit 31 cancels the target ride reservation. Then, in OP209, because the driver moves by the vehicle 10 even though the target ride reservation is not carried out, the reservation processing unit 31 provides a predetermined incentive to the driver. Then, the process illustrated in FIG. 6 is ended, and the process illustrated in FIG. 6 is thereafter not performed for the ride reservation information in question. In the case where the time corresponding to "scheduled meet-up time+$\alpha$" is not yet reached (OP207: NO), the process proceeds to OP205. The process in OP209 is an example of "provision of a predetermined incentive to the driver according to an amount of the increase".

Additionally, the meet-up supporting process illustrated in FIG. 6 is merely an example, and the meet-up supporting process by the center server 300 is not limited to the process illustrated in FIG. 6.

<Operations and Effects of Second Embodiment>

In the second embodiment, when the possibility of communication interruption due to an insufficient remaining amount of battery in the user terminal 200 of a ride reservation is detected at or after a time point that is a predetermined time before the scheduled meet-up time of the ride reservation, the center server 300 changes the scheduled meet-up location of the ride reservation. The scheduled meet-up location after change is determined to be a location that is highly likely the existing location of the vehicle ride seeker. For example, a location that is highly likely the existing location of the vehicle ride seeker is a location indicated by the position information of the user terminal 200 that is received just before detection of communication interruption, position that is estimated from the position information of the user terminal 200 to be the position of the vehicle ride seeker at the scheduled meet-up time, or the like. The possibility of the driver and the vehicle ride seeker of a ride reservation meeting up with each other may thereby be increased, and a trouble that the vehicle ride seeker is not able to meet up with the driver of the ride reservation because of the battery of the user terminal 200 running out, for example, may be avoided.

Furthermore, in the second embodiment, in the case where the traveling distance and/or the traveling time of the vehicle 10 of the driver are/is increased because of change of the scheduled meet-up location of the ride reservation, a predetermined incentive is provided to the driver. Frustration of the driver over the increase in the traveling distance and/or the traveling time of the vehicle 10 may thereby be alleviated, or reduction in motivation to drive the vehicle 10 for the ride-sharing service may thereby be suppressed.

Third Embodiment

In a third embodiment, in the case where it is detected, at or after a time point that is a predetermined time before the scheduled meet-up time of a ride reservation, that the remaining amount of battery in the user terminal 200 of the ride reservation is below a predetermined threshold, the center server 300 performs, as the meet-up supporting process, change of the scheduled meet-up location, and notification of the scheduled meet-up location after change to the user terminal 200. This increases a possibility of the driver and the vehicle ride seeker meeting up with each other before the user terminal 200 of the vehicle ride seeker stops operation because of an insufficient remaining amount of battery. Additionally, also in the third embodiment, descriptions overlapping those of the first and second embodiments are omitted.

Figure 7:
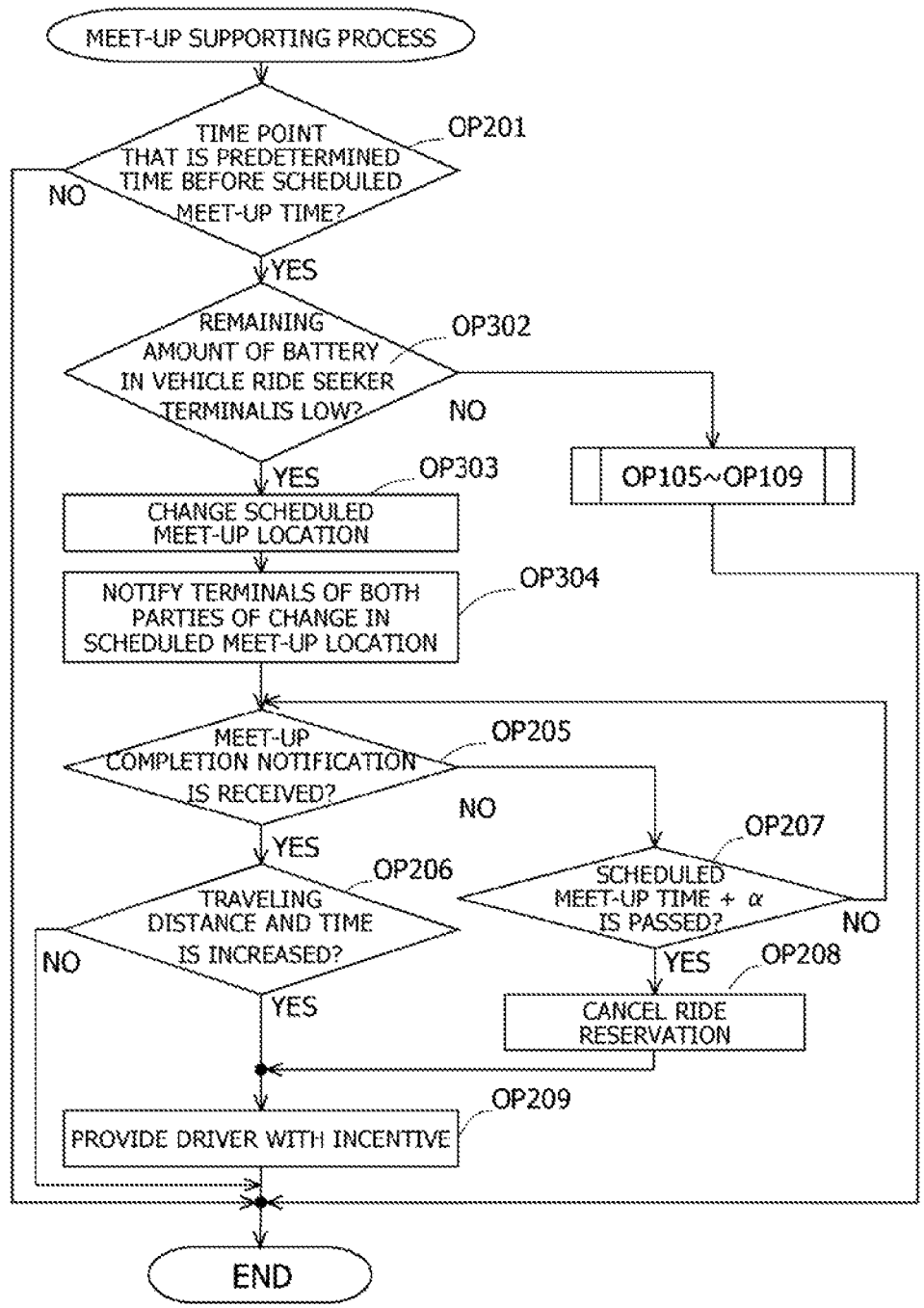
FIG. 7 is an example of a flowchart of the meet-up supporting process by the center server according to the third embodiment.

FIG. 7 is an example of a flowchart of the meet-up supporting process by the center server 300 according to the third embodiment. In the third embodiment, the reservation processing unit 31 of the center server 300 performs the meet-up supporting process illustrated in FIG. 7. The process illustrated in FIG. 7 is repeatedly performed every predetermined period for each piece of ride reservation information held in the reservation information DB 36, for example. Processes the same as those in the flowchart of the meet-up supporting process by the center server 300 illustrated in FIG. 6 are denoted by same reference signs.

When a time point that is a predetermined time before the scheduled meet-up time is reached for target ride reservation information (OP201: YES), the reservation processing unit 31 performs the process in OP302.

In OP302, the reservation processing unit 31 determines whether or not the remaining amount of battery in the user terminal 200 of the vehicle ride seeker is below a predetermined threshold. For example, the threshold is set to a value according to which the user terminal 200 is expected to stop operation within a predetermined time because of an insufficient remaining amount of battery, for example. More specifically, for example, the threshold is set in a range where the remaining amount of battery is several to ten percent of an amount of power in a fully charged state.

In the case where the remaining amount of battery in the user terminal 200 of the vehicle ride seeker is below a predetermined threshold (OP302: YES), the process proceeds to OP303. In the case where the remaining amount of battery in the user terminal 200 of the vehicle ride seeker is at or greater than the predetermined threshold (OP302: NO), processes the same as those in OP105 to OP109 in FIG. 5 are then performed. In a case where a negative determination is made in OP108, the process proceeds to OP302. A positive determination in OP302 is an example of "detection of a possibility of communication interruption due to an insufficient remaining amount of battery" and "detection of a remaining amount of battery in the first wireless communication terminal being below a first threshold". The predetermined threshold is an example of "first threshold".

In OP303, the reservation processing unit 31 changes the scheduled meet-up location in the target ride reservation information. The scheduled meet-up location after change is determined based on the position information of the user terminal 200 and the in-vehicle device 100, a current time, and the like, in such a way that the vehicle ride seeker and the driver are able to meet up before the battery of the user terminal 200 runs out. For example, the reservation processing unit 31 determines the scheduled meet-up location after change to be a location indicated by latest position information of the user terminal 200. Furthermore, for example, in the case where the user terminal 200 is expected to stop operation because of an insufficient remaining amount of battery before the scheduled meet-up time, and a distance between the user terminal 200 and the in-vehicle device 100 of the driver is greater than a distance that the vehicle 10 is able to move within a remaining amount of time until the user terminal 200 stops operation, the reservation processing unit 31 determines a location that is away from a current position of the user terminal 200 by a predetermined distance in a direction of a current position of the in-vehicle device 100 to be the scheduled meet-up location after change. Additionally, the methods of determining the scheduled meet-up location after change are not limited to the methods described above. Moreover, the reservation processing unit 31 may also change the scheduled meet-up time, according to the scheduled meet-up location after change. The process in OP303 is an example of "process regarding a meet-up schedule" and "change of a scheduled meet-up location according to the meet-up schedule to a predetermined location where the first user and the driver can meet up before the first wireless communication terminal stops operation because of the insufficient remaining amount of battery".

In OP304, the reservation processing unit 31 notifies the in-vehicle device 100 of the driver and the user terminal 200 of the vehicle ride seeker in the target ride reservation information, through the terminal communication unit 33, of the change in the scheduled meet-up location and the scheduled meet-up location determined in OP303. The process in OP304 is an example of "notification of the scheduled meet-up location after change to at least a wireless communication terminal that is used by the driver".

Subsequently, for example, when the meet-up completion notification is received from the in-vehicle device 100 of the driver (OP205: YES), an incentive is provided to the driver regarding the increase in the traveling distance and/or the traveling time of the vehicle 10 of the driver (OP206: YES, OP209), as in the case of the flowchart of the meet-up supporting process by the center server 300 illustrated in FIG. 6. For example, if a time corresponding to "scheduled meet-up time+α" passes without the meet-up completion notification being received from the in-vehicle device 100 of the driver (OP205: NO, OP207: YES), the target ride reservation is cancelled (OP208).

Additionally, the meet-up supporting process illustrated in FIG. 7 is merely an example, and the meet-up supporting process by the center server 300 is not limited to the process illustrated in FIG. 7.

<Operations and Effects of Third Embodiment>

In the third embodiment, when it is detected, at or after a time point that is a predetermined time before the scheduled meet-up time of a ride reservation, that the remaining amount of battery in the user terminal 200 of the ride reservation is smaller than the predetermined threshold, the center server 300 changes the scheduled meet-up location of the ride reservation. For example, the scheduled meet-up location after change is set to a location where the vehicle ride seeker and the driver are able to meet up before the user terminal 200 stops operation because of an insufficient remaining amount of battery. The possibility of the driver and the vehicle ride seeker of a ride reservation meeting up with each other while the user terminal 200 is operating may thereby be increased, and a trouble that the vehicle ride seeker is not able to meet up with the driver of the ride reservation because of the battery of the user terminal 200 running out, for example, may be avoided.

Fourth Embodiment

In a fourth embodiment, as the meet-up supporting process, the center server 300 performs processes stagewise according to a state of communication interruption due to an insufficient remaining amount of battery in the user terminal 200 of the vehicle ride seeker. Specifically, in the case where interruption of communication with the user terminal 200 is detected to be continuing for a time length T2 (T1>T2) or longer, the center server 300 changes the scheduled meet-up location. Then, when the time length T1 or longer passes while communication with the user terminal 200 is still interrupted, the center server 300 cancels the ride reservation. The time length T2 is set in a range of one to ten minutes, for example, but such a range is not restrictive. A ride reservation is thereby prevented from being unintentionally cancelled, and the possibility of the driver and the vehicle ride seeker meeting up with each other may be increased. Additionally, in the fourth embodiment, descriptions overlapping those of the first to third embodiments are omitted.

Figure 8:
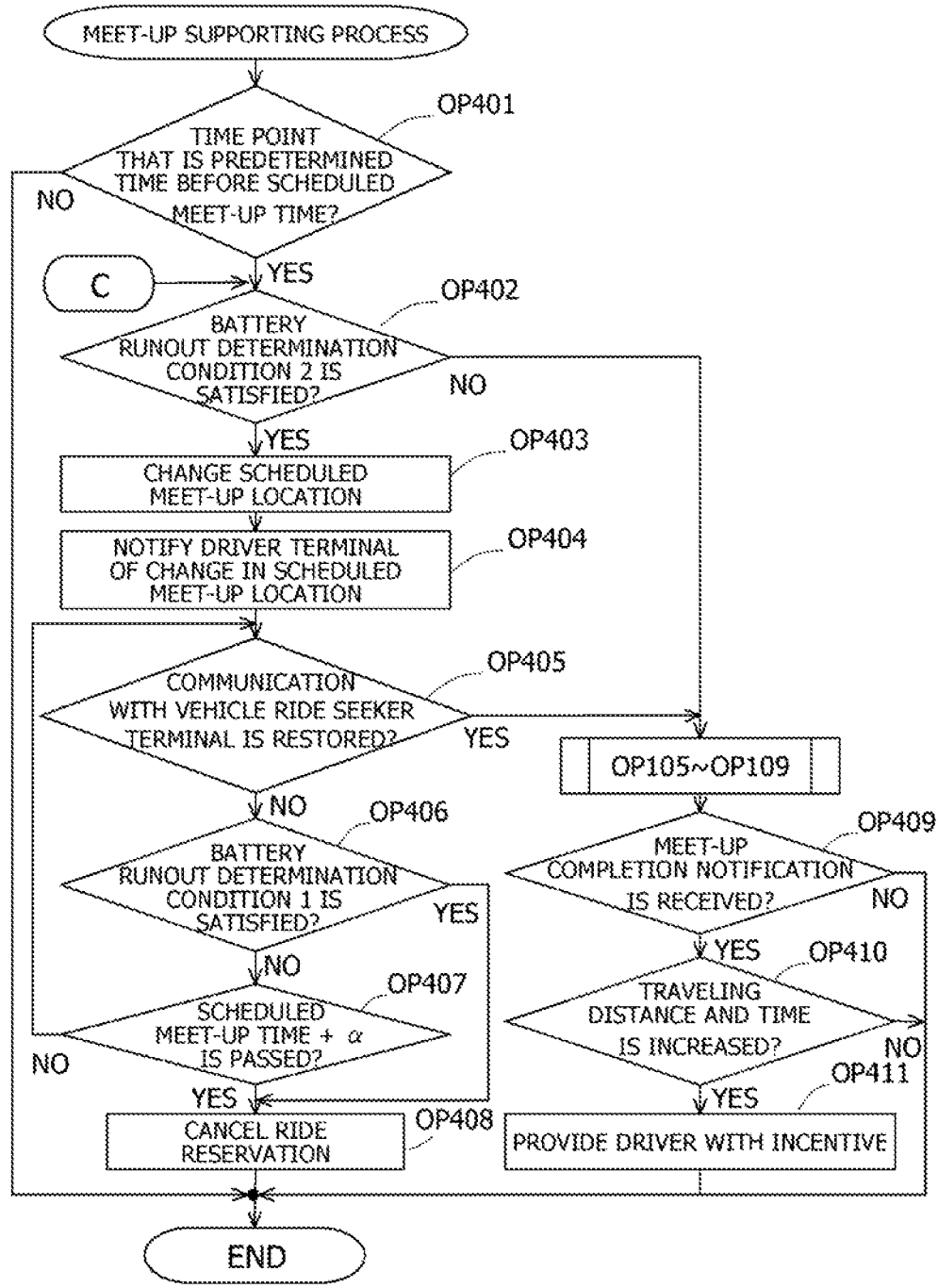
FIG. 8 is an example of a flowchart of the meet-up supporting process by the center server according to the fourth embodiment.

FIG. 8 is an example of a flowchart of the meet-up supporting process by the center server 300 according to the fourth embodiment. In the fourth embodiment, the reservation processing unit 31 of the center server 300 performs the meet-up supporting process illustrated in FIG. 8. The process illustrated in FIG. 8 is repeatedly performed every predetermined period for each piece of ride reservation information held in the reservation information DB 36, for example.

In OP401, the reservation processing unit 31 determines, with respect to target ride reservation information, whether or not a time point that is a predetermined time before the scheduled meet-up time is reached. In the case where a time point that is a predetermined time before the scheduled meet-up time is reached (OP401: YES), the process proceeds to OP402. In the case where the time point that is a predetermined time before the scheduled meet-up time is not yet reached (OP401: NO), the process illustrated in FIG. 8 is ended.

In OP402, the reservation processing unit 31 determines whether or not a battery runout determination condition 2 is satisfied. The battery runout determination condition 2 is a condition for determining a possibility of interruption of communication due to an insufficient remaining amount of battery in the user terminal 200 of the vehicle ride seeker. For example, the battery runout determination condition 2 is that the position information and/or information about the remaining amount of battery are/is not received from the user terminal 200 for the time length T2 or longer, or disconnection of a session with the user terminal 200 for the time length T2 or longer.

In the case where the battery runout determination condition 2 is satisfied (OP402: YES), the process proceeds to OP403. In the case where the battery runout determination condition 2 is not satisfied (OP402: NO), processes the same as those in OP105 to OP109 in FIG. 5 are then performed. In a case where a negative determination is made in OP108, the process proceeds to OP402. A positive determination in OP402 is an example of a case where "interruption of communication with the first wireless communication terminal is detected continuously for a second time length or longer, where the second time length is shorter than the first time length". The time length T2 is an example of "second time length".

In OP403, the reservation processing unit 31 changes the scheduled meet-up location of the target ride reservation information. For example, the scheduled meet-up location after change is determined to be one of a location specified in advance by the vehicle ride seeker as a candidate meet-up location in case of runout of battery in the user terminal 200, a location indicated by the position information that is last received from the user terminal 200 immediately before it is determined that the battery runout determination condition 2 is satisfied, a position that is estimated from a record of the position information of the user terminal 200 to be the position of the vehicle ride seeker at the scheduled meet-up time, and the scheduled meet-up location that is the same as before change, for example. The process in OP403 is an example of "change of a scheduled meet-up location according to the meet-up schedule to a predetermined location that is possibly an existing location of the first user".

In OP404, the reservation processing unit 31 notifies the in-vehicle device 100 of the driver in the target ride reservation information, through the terminal communication unit 33, of the change in the scheduled meet-up location and the scheduled meet-up location determined in OP403.

In OP405, the reservation processing unit 31 determines whether or not communication with the user terminal 200 of the vehicle ride seeker is restored. For example, the reservation processing unit 31 performs the determination based on reception of the position information and/or information about the remaining amount of battery from the user terminal 200 that is performed every predetermined period, or restoration of a communication session with the user terminal 200. In the case where communication with the user terminal 200 of the vehicle ride seeker is restored (OP405: YES), processes the same as those in OP105 to OP109 in FIG. 5 are then performed. In a case where a negative determination is made in OP108, the process proceeds to OP402. In the case where communication with the user terminal 200 of the vehicle ride seeker is not restored (OP405: NO), the process proceeds to OP406.

In OP406, the reservation processing unit 31 determines whether or not the battery runout determination condition 1 is satisfied. In the case where the battery runout determination condition 1 is satisfied (OP406: YES), the process proceeds to OP408, and in OP408, the reservation processing unit 31 cancels the ride reservation. Then, the process illustrated in FIG. 8 is ended for the target ride reservation information, and the process illustrated in FIG. 8 is thereafter not performed for the ride reservation information in question. In the case where the battery runout determination condition 1 is not satisfied (OP406: NO), the process proceeds to OP407.

In OP407, the reservation processing unit 31 determines whether or not a time corresponding to "scheduled meet-up time+α" is passed. In the case where the time corresponding to "scheduled meet-up time+α" is passed (OP407: YES), the process proceeds to OP408, and in OP408, the reservation processing unit 31 cancels the ride reservation. Then, the process illustrated in FIG. 8 is ended for the target ride reservation information, and the process illustrated in FIG. 8 is thereafter not performed for the ride reservation information in question. In the case where the time corresponding to "scheduled meet-up time+α" is not passed (OP407: NO), the process proceeds to OP405.

In OP409, whether or not the processes from OP105 to OP109 are ended by reception of the meet-up completion notification is determined. In the case where the processes from OP105 to OP109 are ended by reception of the meet-up completion notification (OP409: YES), the process proceeds to OP410. In the case where the processes from the OP105 to OP109 are ended not because of reception of the meet-up completion notification (OP410: NO), the process illustrated in FIG. 8 is ended for the target ride reservation information, and the process illustrated in FIG. 8 is thereafter not performed for the ride reservation information in question.

In OP410, the reservation processing unit 31 determines whether or not the traveling distance and/or the traveling time of the vehicle 10 of the driver are/is increased from an initial schedule. In the case where the traveling distance and/or the traveling time of the vehicle 10 of the driver are/is increased (OP410: YES), the process proceeds to OP411, and in OP411, the reservation processing unit 31 provides the driver with an incentive according to an amount of increase in the traveling distance and/or the traveling time. Then, the process illustrated in FIG. 8 is ended for the target ride reservation information, and the process illustrated in FIG. 8 is thereafter not performed for the ride reservation information in question.

In the case where there is no increase in the traveling distance and/or the traveling time of the vehicle 10 of the driver (OP410: NO), the process illustrated in FIG. 8 is ended for the target ride reservation information, and the process illustrated in FIG. 8 is thereafter not performed for the ride reservation information in question. Additionally, the meet-up supporting process illustrated in FIG. 8 is merely an example, and the meet-up supporting process by the center server 300 is not limited to the process illustrated in FIG. 8.

<Operations and Effects of Fourth Embodiment>

In the example illustrated in FIG. 8, a time point that is a predetermined time before the scheduled meet-up time is given as a time t1. A time point that is the time length T1 before "scheduled meet-up time+α" is given as a time t2. In the example illustrated in FIG. 8, for example, in the case where operation of the user terminal 200 stops operation between the time t1 and the time t2 because of an insufficient remaining amount of battery, and this state continues for the time length T2 or longer (OP402: YES), the scheduled meet-up location is changed (OP403).

In the fourth embodiment, the center server 300 changes the scheduled meet-up location in the case where communication interruption due to an insufficient remaining amount of battery in the user terminal 200 continues for the time length T2 or longer, and then, when this state continues for the time length T1 or longer, the center server 300 cancels the ride reservation. Accordingly, for example, the possibility of the vehicle ride seeker and the driver meeting up with each other may be increased by the driver moving to a predetermined location that is possibly the existing location of the vehicle ride seeker, when the scheduled meet-up time is reached during a period from the time length T2 to less than the time length T1 from interruption of communication with the user terminal 200, for example. Furthermore, in the case where there is no prospect of the user terminal 200 being restored, the ride reservation is cancelled, and a burden on the driver may be reduced.

Additionally, the time length T1 and the time length T2 may be fixed values, or may be set variable according to a remaining time until the scheduled meet-up time.

Fifth Embodiment

In a fifth embodiment, in the case where the remaining amount of battery in the user terminal 200 of a ride reservation is detected in the meet-up supporting process to be below a predetermined threshold at or after a time point that is a predetermined time before the scheduled meet-up time of the ride reservation, the center server 300 inquires of the user terminal 200 of the vehicle ride seeker about the scheduled meet-up location in case of operation stop due to an insufficient remaining amount of battery.

Figure 9:
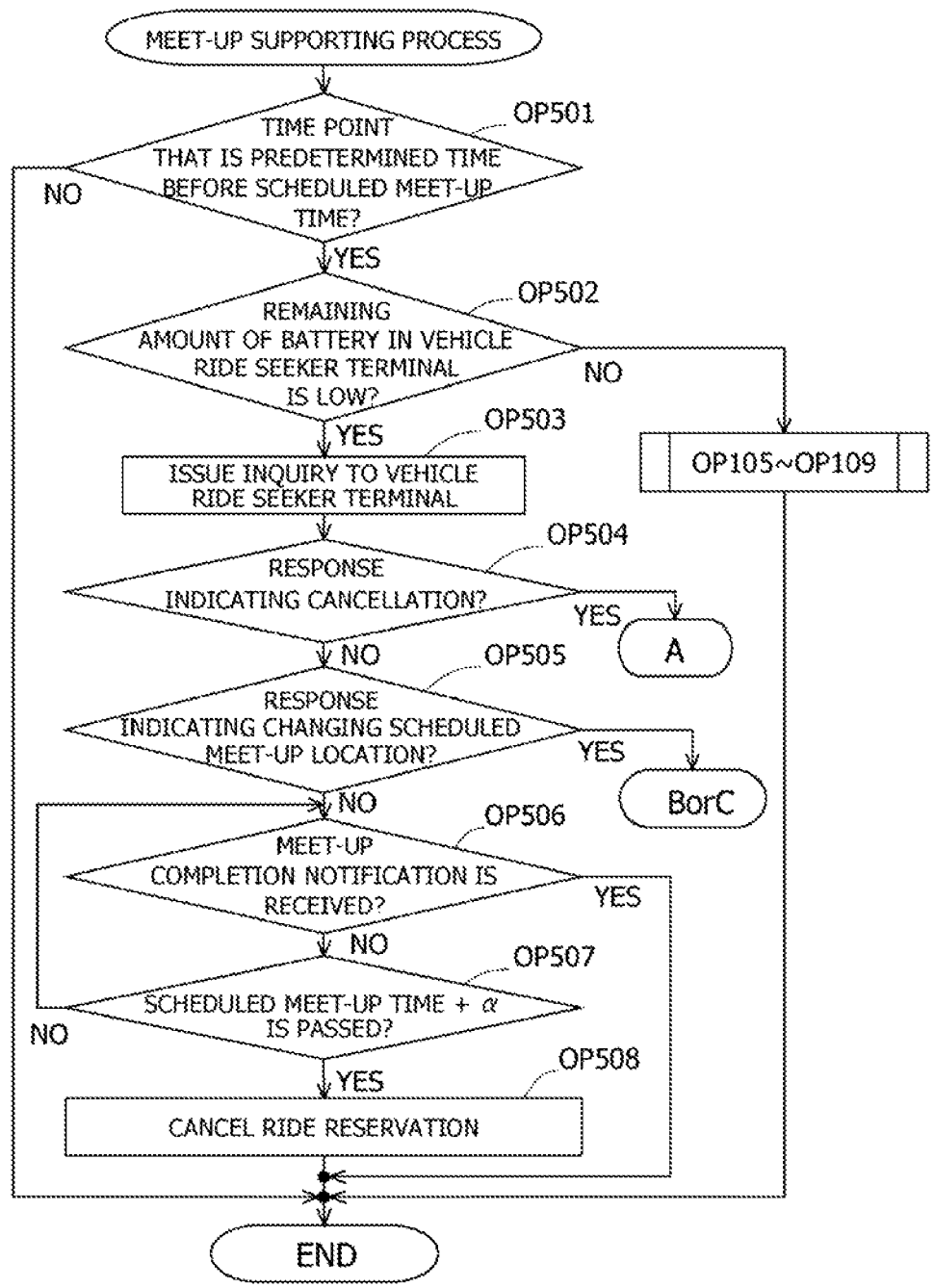
FIG. 9 is an example of a flowchart of the meet-up supporting process by the center server according to the fifth embodiment.

FIG. 9 is an example of a flowchart of the meet-up supporting process by the center server 300 according to the fifth embodiment. In the fifth embodiment, the reservation processing unit 31 of the center server 300 performs the meet-up supporting process illustrated in FIG. 9. The process illustrated in FIG. 9 is repeatedly performed every predetermined period for each piece of ride reservation information held in the reservation information DB 36, for example.

In OP501, the reservation processing unit 31 determines, with respect to target ride reservation information, whether or not a time point that is a predetermined time before the scheduled meet-up time is reached. In the case where the time point that is a predetermined time before the scheduled meet-up time is reached (OP501: YES), the process proceeds to OP502. In the case where the time point that is a predetermined time before the scheduled meet-up time is not yet reached (OP501: NO), the process illustrated in FIG. 9 is ended.

In OP502, the reservation processing unit 31 determines whether or not the remaining amount of battery in the user terminal 200 of the vehicle ride seeker is below a predetermined threshold. The threshold is set to a value according to which the user terminal 200 is expected to stop operation within a predetermined time because of an insufficient remaining amount of battery, for example. More specifically, for example, the threshold is set in a range where the remaining amount of battery is several to ten percent of the amount of power in a fully charged state. For example, the threshold for the remaining amount of battery used in OP502 may take a value that is the same or greater than the threshold for the remaining amount of battery used in OP302 in FIG. 7.

In the case where the remaining amount of battery in the user terminal 200 of the vehicle ride seeker is below the predetermined threshold (OP502: YES), the process proceeds to OP503. In the case where the remaining amount of battery in the user terminal 200 of the vehicle ride seeker is at or greater than the predetermined threshold (OP502: NO), processes the same as those in OP105 to OP109 in FIG. 5 are then performed. In a case where a negative determination is made in OP108, the process proceeds to OP502. A positive determination in OP502 is an example of a case where "a remaining amount of battery in the first wireless communication terminal is detected to be below a second threshold". The predetermined threshold is an example of "second threshold".

In OP503, the reservation processing unit 31 inquires of the user terminal 200 of the vehicle ride seeker, through the terminal communication unit 33, about a measure to be taken in case of operation stop due to an insufficient remaining amount of battery. Options for the measure to be taken in case of operation stop due to an insufficient remaining amount of battery are also transmitted to the user terminal 200, together with the inquiry. For example, the options for the measure to be taken in case of operation stop due to an insufficient remaining amount of battery include cancellation of the ride reservation (first embodiment), changing the scheduled meet-up location (second or fourth embodiment), not changing the scheduled meet-up location, and the like, and in the following description, it is assumed that the options mentioned above are transmitted to the user terminal 200, but such a case is not restrictive. The process in OP503 is an example of "transmission, to the first wireless communication terminal, of options for the process regarding the meet-up schedule".

In OP504, the reservation processing unit 31 determines whether or not a selection result indicating cancellation of the ride reservation is received together with a response from the user terminal 200. In the case where a selection result indicating cancellation of the ride reservation is received (OP504: YES), the process proceeds to OP102 in FIG. 5, and the process described with reference to FIG. 5 is performed thereafter. In the case where a selection result indicating cancellation of the ride reservation is not received (OP504: NO), the process proceeds to OP505.

In OP505, the reservation processing unit 31 determines whether or not a selection result indicating changing the scheduled meet-up location is received together with a response from the user terminal 200. In the case where a selection result indicating changing the scheduled meet-up location is received (OP505: YES), the process proceeds to one of OP202 in FIG. 6 and OP402 in FIG. 8, and the process described with reference to FIG. 6 or FIG. 8 is performed thereafter. Which process is to be performed depends on the embodiment, for example. In the case where a selection result indicating changing the scheduled meet-up location is not received (OP505: NO), or in other words, in the case where a selection result indicating not changing the scheduled meet-up location is received, the process proceeds to OP506.

In the case where not changing the scheduled meet-up location is selected, the meet-up location is not changed and the ride reservation is not cancelled, even if the user terminal 200 stops operation because of an insufficient remaining amount of battery, for example. Accordingly, in the case where a time corresponding to "scheduled meet-up time+α" is passed (OP507: YES) without reception of the meet-up completion notification at least from the in-vehicle device 100 (OP506: NO), the reservation processing unit 31 cancels the ride reservation (OP508).

<Operations and Effects of Fifth Embodiment>

In the fifth embodiment, in the case where the remaining amount of battery in the user terminal 200 becomes low, the center server 300 inquires of the user terminal 200 about a measure to be taken in case of operation stop due to an insufficient remaining amount of battery. The vehicle ride seeker may thus grasp what measure is to be taken by the center server 300 in case of operation stop of the user terminal 200 due to an insufficient remaining amount of battery, for example. Accordingly, for example, even if the user terminal 200 stops operation because of an insufficient remaining amount of battery, there is a possibility of the vehicle ride seeker and the driver meeting up with each other.

Sixth Embodiment

In a sixth embodiment, the center server 300 determines, for one vehicle 10, whether or not there is a user terminal 200, the remaining amount of battery of which is below a predetermined threshold, among the user terminals 200 of a plurality of vehicle ride seekers whose riding periods in the ride reservations overlap each other. In the case where there is a user terminal 200, the remaining amount of battery of which is below a predetermined threshold, the center server 300 changes an order of meet-up such that the vehicle ride seeker may meet up with the driver of the vehicle 10 while the user terminal 200 in question is still operating. In the sixth embodiment, descriptions overlapping those of the first to fifth embodiments are omitted.

The process of changing the order of meet-up so as to enable the vehicle ride seeker of the user terminal 200 with a low remaining amount of battery to preferentially meet up with the driver will be referred to as a meet-up supporting process 2. Furthermore, the vehicle ride seekers whose riding periods in the ride reservations overlap each other will be referred to as "ride-sharing passenger(s)".

In the sixth embodiment, the center server 300 may perform just the meet-up supporting process 2, or may perform the meet-up supporting process 2 in parallel with one of the meet-up supporting processes in the first to fifth embodiments, for example.

Figure 10:
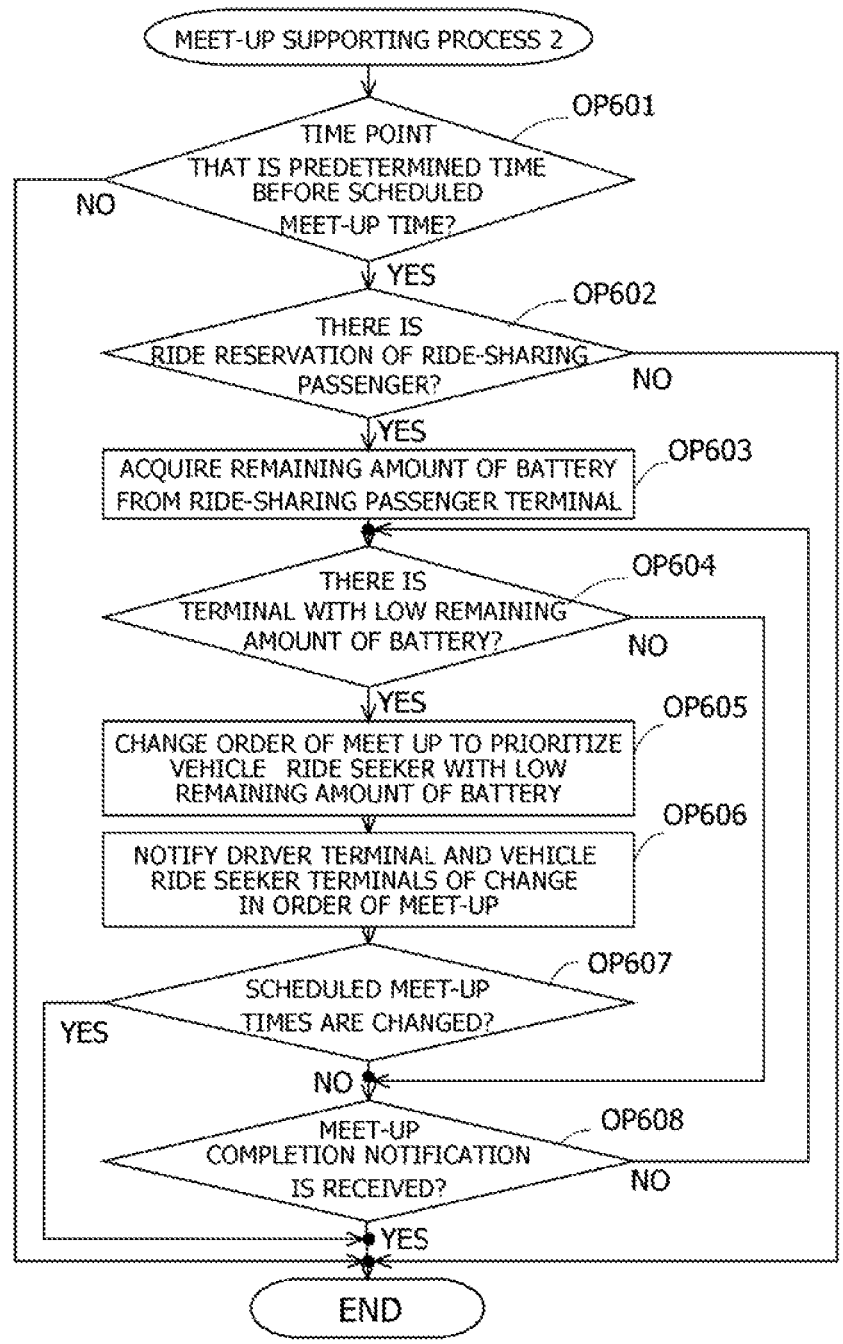
FIG. 10 is an example of a flowchart of the meet-up supporting process by the center server according to the sixth embodiment.

FIG. 10 is an example of a flowchart of the meet-up supporting process 2 by the center server 300 according to the sixth embodiment. The process illustrated in FIG. 10 is repeatedly performed every predetermined period for each piece of ride reservation information held in the reservation information DB 36, for example.

In OP601, the reservation processing unit 31 determines, with respect to target ride reservation information, whether or not a time point that is a predetermined time before the scheduled meet-up time is reached. In the case where the time point that is a predetermined time before the scheduled meet-up time is reached (OP601: YES), the process proceeds to OP602. In the case where the time point that is a predetermined time before the scheduled meet-up time in the target ride reservation information is not yet reached (OP601: NO), the process illustrated in FIG. 10 is ended.

In OP602, the reservation processing unit 31 determines, for a vehicle ride seeker in the target ride reservation information, whether or not there is a ride-sharing passenger. For example, determination of whether or not there is a ride-sharing passenger is performed based on the value in the ride-sharing passenger presence/absence field in the target ride reservation information in the reservation information DB 36. In the case where there is a ride-sharing passenger (OP602: YES), the process proceeds to OP603. In the case where there is no ride-sharing passenger (OP602: NO), the process illustrated in FIG. 10 is ended for the target ride reservation information.

In OP603, the reservation processing unit 31 acquires information about the remaining amount of battery from the user terminal 200 of the ride-sharing passenger in the target ride reservation information. The ride-sharing passenger in the target ride reservation information is a vehicle ride seeker in the ride reservation information, the driver ID of which matches that in the target ride reservation information, and the scheduled meet-up time of which is within a predetermined time from the scheduled meet-up time in the target ride reservation information, for example. The predetermined time is set in a range that does not go beyond a desired arrival time in the target ride reservation information, and that is a range of several minutes to about one hour. Additionally, the user terminal 200 that is extracted in OP603 as the ride-sharing passenger is not limited to such an example. For example, it may be the user terminal 200 of the vehicle ride seeker in the ride reservation information, the driver ID of which matches that in the target ride reservation information, and the riding period of which overlaps that in the target ride reservation information. The riding period is a period between the scheduled meet-up time and the desired arrival time, for example.

For example, information about the remaining amount of battery in the user terminal 200 is acquired by transmission of an inquiry request to the user terminal 200. Additionally, for example, transmission, performed every predetermined period by the user terminal 200 of the vehicle ride seeker in the target ride reservation information, of the position information and information about the remaining amount of battery to the center server 300 is started when the time point that is a predetermined time before the scheduled meet-up time is reached.

In OP604, the reservation processing unit 31 determines whether or not there is a user terminal 200, the remaining amount of battery of which is below a predetermined threshold, among the user terminals 200 of the vehicle ride seeker and a ride-sharing passenger. In the case where there is a user terminal 200 of a ride-sharing passenger, the remaining amount of battery of which is below a predetermined threshold (OP604: YES), the process proceeds to OP605. In the case where there is no user terminal 200 of a ride-sharing passenger, the remaining amount of battery of which is below a predetermined threshold (OP604: NO), the process proceeds to OP608. The user terminal 200, the remaining amount of battery of which is below a predetermined threshold, and the vehicle ride seeker or the ride-sharing passenger of such a user terminal 200 are an example of "first wireless communication terminal" and "first user", respectively. The vehicle ride seeker or the ride-sharing passenger of a user terminal 200, the remaining amount of battery of which is not below a predetermined threshold, is an example of "second user".

In OP605, the reservation processing unit 31 changes the order of meet-up in such a way as to prioritize meet-up of the driver and the vehicle ride seeker or the ride-sharing passenger of the user terminal 200 with a low remaining amount of battery. A method of changing the order of meet-up may be any method. For example, the order of meet-up may be changed such that the vehicle ride seeker or the ride-sharing passenger of the user terminal 200 with a low remaining amount of battery comes first, and others are moved back. For example, the order of meet-up may be changed in such a way that a movement distance becomes the shortest, and the turn of the vehicle ride seeker or the ride-sharing passenger of the user terminal 200 with a low remaining amount of battery comes faster than a current turn. The process in OP605 is an example of "changing of turns in an order of meet-up such that the first user comes first".

In OP606, the reservation processing unit 31 notifies the in-vehicle device 100 of the driver and the user terminals 200 of the vehicle ride seeker and the ride-sharing passenger, in the target ride reservation information, of the change in the order of meet-up. Additionally, in the case where the scheduled meet-up times are also changed together with the order of meet-up, notifications are issued also with respect to the scheduled meet-up times.

In OP607, the reservation processing unit 31 determines whether or not the scheduled meet-up times in the target ride reservation information are changed. Additionally, in the case where the scheduled meet-up times in the target ride reservation information are changed because of the order of meet-up being changed in OP605, the scheduled meet-up times are changed to later times than the initial scheduled meet-up times. Accordingly, in the case where the scheduled meet-up times in the target ride reservation information are changed (OP607: YES), the process illustrated in FIG. 10 is ended, and the process illustrated in FIG. 10 is started again for the target ride reservation information, when a time point that is a predetermined time before the new scheduled meet-up time is reached. In the case where the scheduled meet-up times in the target ride reservation information are not changed (OP607: NO), the process proceeds to OP608.

In OP608, the reservation processing unit 31 determines, with respect to the target ride reservation information, whether or not the meet-up completion notification is received at least from the in-vehicle device 100 of the driver. In the case where the meet-up completion notification is received (OP608: YES), the process illustrated in FIG. 10 is ended for the target ride reservation information, and the process illustrated in FIG. 10 is thereafter not performed for the target ride reservation information. In the case where the meet-up completion notification is not received (OP608: NO), the process proceeds to OP604. Additionally, in the case where the traveling distance and/or the traveling time of the vehicle 10 and/is increased because of the change in the order of meet-up, an incentive may be provided to the driver according to the amount of increase.

<Operations and Effects of Sixth Embodiment>

In the sixth embodiment, in the case where there are a plurality of vehicle ride seekers whose riding periods on one vehicle 10 overlap each other, the order of meet-up is changed such that the vehicle ride seeker of the user terminal 200 with a low remaining amount of battery is preferentially enabled to meet up. Accordingly, for example, the possibility of meeting up with the driver may be increased even if the remaining amount of battery becomes low at a timing earlier than the scheduled meet-up time.

Other Embodiments

The embodiment described above is an example, and the present disclosure may be changed and carried out as appropriate without departing from the gist of the present disclosure.

In the first embodiment and the example modification, a description is given taking the in-vehicle device 100 as the terminal to be used by the driver, but such a case is not restrictive, and the terminal to be used by the driver may be a wireless communication terminal such as the user terminal 200, such as a smartphone or a tablet terminal.

Furthermore, in the first to fifth embodiments, a description is given regarding an insufficient remaining amount of battery in the user terminal 200 of the vehicle ride seeker, but the same processes may be applied to a case where the remaining amount of battery in the in-vehicle device 100 of the driver is insufficient. Additionally, an incentive is not provided to the driver with respect to an increase in the traveling distance and/or the time due to the insufficient remaining amount of battery in the in-vehicle device 100 of the driver.

In the first to sixth embodiments, the meet-up supporting processes illustrated in FIGS. 5 to 10 are started with arrival of a time point that is a predetermined time before the scheduled meet-up time in the target ride reservation information as a trigger, but such a case is not restrictive. For example, in any of the first to sixth embodiments, the meet-up supporting process may be started with registration of ride reservation information as a trigger.

The processes and means described in the present disclosure may be freely combined to the extent that no technical conflict exists.

A process which is described to be performed by one device may be performed divided among a plurality of devices. Processes described to be performed by different devices may be performed by one device. Each function is to be implemented by which hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. An information processing apparatus comprising:
   a processor programmed to
      perform detection of a possibility of communication interruption due to an insufficient remaining amount of battery of a first wireless communication terminal, by detecting an interruption of communication with the first wireless communication terminal that continues for a first time length or longer, the first wireless communication terminal being used by a first user for whom a ride reservation for a vehicle is established with a driver of the vehicle; and
      when the possibility of communication interruption due to the insufficient remaining amount of battery is detected for the first wireless communication terminal, perform a process regarding a meet-up schedule of the driver and the first user of the ride reservation.

2. The information processing apparatus according to claim 1, wherein the processor is programmed to
   perform, as the process regarding the meet-up schedule, cancellation of the ride reservation.

3. The information processing apparatus according to claim 1, wherein the processor is programmed to
   perform, as the process regarding the meet-up schedule, change of a scheduled meet-up location according to the meet-up schedule to a predetermined location that is possibly an existing location of the first user.

4. The information processing apparatus according to claim 2, wherein the processor is programmed to perform, when the interruption of communication with the first wireless communication terminal is detected continuously for a second time length or longer, change of a schedule meet-up location according to the meet-up schedule to a predetermined location that is possibly an existing location of the first user, where the second time length is shorter than the first time length.

5. The information processing apparatus according to claim 1, wherein the processor is programmed to
   perform detection of the possibility of communication interruption due to the insufficient remaining amount of battery, by detecting that a remaining amount of battery in the first wireless communication terminal is below a first threshold, and
   perform, as the process regarding the meet-up schedule, change of a scheduled meet-up location according to the meet-up schedule to a predetermined location where the first user and the driver can meet up before the first wireless communication terminal stops operation because of the insufficient remaining amount of battery, and notification of the scheduled meet-up location after change to at least a wireless communication terminal that is used by the driver.

6. The information processing apparatus according to claim 1, wherein the processor is further programmed to
   perform transmission, to the first wireless communication terminal, of options for the process regarding the meet-up schedule, when a remaining amount of battery in the first wireless communication terminal is detected to be below a second threshold, and
   perform a process selected by the first user from the options, when the possibility of communication interruption due to the insufficient remaining amount of battery is detected for the first wireless communication terminal.

7. The information processing apparatus according to claim 1, wherein the processor is programmed to
   perform detection of the possibility of communication interruption due to the insufficient amount of battery, by detecting that a remaining amount of battery in the first wireless communication terminal is below a first threshold, and
   change turns in an order of meet-up in such a way that the first user comes first, when the remaining amount of battery in the first wireless communication terminal is below the first threshold, and there is a second user whose riding period on the vehicle overlaps the riding period of the first user and whose turn in the order of meet-up with the driver comes before the turn of the first user.

8. The information processing apparatus according to claim 3, wherein, when a change in the scheduled meet-up location causes an increase in a traveling distance and/or a traveling time of the vehicle relative to before the change, the processor is programmed to provide a predetermined incentive to the driver according to an amount of the increase.

9. An information processing system comprising
   a processor programmed to
      perform detection of a possibility of communication interruption due to an insufficient remaining amount of battery of a first wireless communication terminal, by detecting an interruption of communication with the first wireless communication terminal that continues for a first time length or longer, the first wireless communication terminal being used by a first user for whom a ride reservation for a vehicle is established with a driver of the vehicle; and
      perform, when the possibility of communication interruption due to the insufficient remaining amount of battery is detected for the first wireless communication terminal, a process regarding a meet-up schedule of the driver and the first user of the ride reservation.

10. An information processing method comprising:

detecting a possibility of communication interruption due to an insufficient remaining amount of battery of a first wireless communication terminal, by detecting an interruption of communication with the first wireless communication terminal that continues for a first time length or longer, the first wireless communication terminal used by a first user for whom a ride reservation for a vehicle is established with a driver of the vehicle; and performing, when where the possibility of communication interruption due to the insufficient remaining amount of battery is detected for the first wireless communication terminal, a process regarding a meet-up schedule of the driver and the first user of the ride reservation.

\* \* \* \* \*